United States Patent
Wurman et al.

(10) Patent No.: US 9,663,293 B2
(45) Date of Patent: May 30, 2017

(54) REPLENISHING A RETAIL FACILITY

(71) Applicant: Amazon Technologies, Inc., Reno, NV (US)

(72) Inventors: Peter R. Wurman, Acton, MA (US); Michael C. Mountz, Lexington, MA (US)

(73) Assignee: Amazon Technologies, Inc., Reno, NV (US)

( * ) Notice: Subject to any disclaimer, the term of this patent is extended or adjusted under 35 U.S.C. 154(b) by 767 days.

(21) Appl. No.: 13/647,147

(22) Filed: Oct. 8, 2012

(65) Prior Publication Data
US 2014/0100769 A1    Apr. 10, 2014

(51) Int. Cl.
B65G 1/10 (2006.01)
G06Q 10/08 (2012.01)
B65G 1/137 (2006.01)

(52) U.S. Cl.
CPC ............ *B65G 1/10* (2013.01); *G06Q 10/087* (2013.01); *B65G 1/137* (2013.01); *B65G 2207/40* (2013.01); *B65G 2209/04* (2013.01)

(58) Field of Classification Search
USPC .......................... 701/301; 705/26, 28, 26.28; 700/213–217, 226–229; 235/383, 385
See application file for complete search history.

(56) References Cited

U.S. PATENT DOCUMENTS

| | | | |
|---|---|---|---|
| 4,678,390 A | * | 7/1987 | Bonneton et al. ............. 414/282 |
| 4,932,828 A | * | 6/1990 | Katae et al. .................. 414/286 |
| 5,143,193 A | * | 9/1992 | Geraci ........................... 194/212 |
| 5,156,513 A | | 10/1992 | Galan et al. |
| 5,211,523 A | * | 5/1993 | Andrada Galan et al. ... 414/282 |
| 5,228,820 A | * | 7/1993 | Stansfield et al. ............ 414/278 |

(Continued)

FOREIGN PATENT DOCUMENTS

| | | |
|---|---|---|
| EP | 1847895 | 10/2007 |
| JP | 56004870 | 1/1981 |

(Continued)

OTHER PUBLICATIONS

KIVA Systems White Paper, Inc Magazine, Oct. 2009, url: http://www.wtgnews.com/wp-content/uploads/2011/07/Whitepaper_Fulfillment-2dot0_20113020101.pdf.*

(Continued)

*Primary Examiner* — Aaron L Troost
(74) *Attorney, Agent, or Firm* — Baker Botts L.L.P.

(57) ABSTRACT

A system includes storage shelves and display shelves at a retail facility. The system also includes a management module operable to determine to replenish a display shelf with an inventory item stored by a storage shelf. The management module is also operable to coordinate movement of mobile drive units to replenish the display shelf with the inventory item at an inventory restocking station. The system also includes a first mobile drive unit and a second mobile drive unit. The first mobile drive unit is operable to receive first instructions from the management module to transport the display shelf to the inventory restocking station. The second mobile drive unit is operable to receive second instructions from the management module to transport the storage shelf to the inventory restocking station. At the inventory restocking station, the display shelf receives the inventory item.

28 Claims, 7 Drawing Sheets

(56) References Cited

U.S. PATENT DOCUMENTS

| | | | |
|---|---|---|---|
| 5,273,392 A | 12/1993 | Bernard, II et al. | |
| 5,379,905 A | 1/1995 | Bustos et al. | |
| 5,449,229 A * | 9/1995 | Aschenbrenner et al. | 312/283 |
| 5,582,497 A * | 12/1996 | Noguchi | 414/281 |
| 5,595,263 A * | 1/1997 | Pignataro | 186/53 |
| 5,757,650 A * | 5/1998 | Yamashita et al. | 700/214 |
| 6,042,321 A * | 3/2000 | Labell | 414/276 |
| 6,208,908 B1 * | 3/2001 | Boyd et al. | 700/216 |
| 6,289,260 B1 * | 9/2001 | Bradley et al. | 700/216 |
| 6,325,586 B1 * | 12/2001 | Loy | 414/281 |
| 6,505,093 B1 * | 1/2003 | Thatcher et al. | 700/216 |
| 6,584,375 B2 * | 6/2003 | Bancroft et al. | 700/213 |
| 6,652,213 B1 * | 11/2003 | Mitchell et al. | 414/284 |
| 6,748,292 B2 | 6/2004 | Mountz | |
| 6,895,301 B2 | 5/2005 | Mountz | |
| 6,950,722 B2 | 9/2005 | Mountz | |
| 7,099,745 B2 * | 8/2006 | Ebert | 700/245 |
| 7,139,637 B1 * | 11/2006 | Waddington et al. | 700/216 |
| 7,206,753 B2 * | 4/2007 | Bancroft et al. | 705/7.29 |
| 7,336,177 B2 * | 2/2008 | Onderko et al. | 340/572.1 |
| 7,370,005 B1 * | 5/2008 | Ham et al. | 705/28 |
| 7,402,018 B2 | 7/2008 | Mountz et al. | |
| 7,532,947 B2 * | 5/2009 | Waddington et al. | 700/216 |
| 7,591,630 B2 * | 9/2009 | Lert, Jr. | 414/807 |
| 7,682,122 B2 * | 3/2010 | Maynard et al. | 414/276 |
| 7,693,757 B2 * | 4/2010 | Zimmerman | 705/28 |
| 7,774,243 B1 * | 8/2010 | Antony et al. | 705/28 |
| 7,780,020 B2 * | 8/2010 | Yoshitaka | 212/332 |
| 7,826,919 B2 | 11/2010 | D'Andrea et al. | |
| 7,850,413 B2 | 12/2010 | Fontana | |
| 7,873,496 B2 | 1/2011 | Gajic | |
| 7,890,878 B2 * | 2/2011 | Bass et al. | 715/764 |
| 7,894,932 B2 | 2/2011 | Mountz et al. | |
| 7,894,933 B2 | 2/2011 | Mountz et al. | |
| 7,896,243 B2 * | 3/2011 | Herskovitz | 235/383 |
| 7,912,574 B2 | 3/2011 | Wurman et al. | |
| 7,920,962 B2 | 4/2011 | D'Andrea et al. | |
| 7,949,568 B2 * | 5/2011 | Fano et al. | 705/22 |
| 8,068,978 B2 | 11/2011 | D'Andrea et al. | |
| 8,070,410 B2 * | 12/2011 | Rebstock | 414/281 |
| 8,161,887 B2 * | 4/2012 | Cardoni | 104/118 |
| 8,170,711 B2 | 5/2012 | D'Andrea et al. | |
| 8,179,261 B2 * | 5/2012 | Frabasile | 340/572.4 |
| D663,359 S * | 7/2012 | Hallenbeck et al. | D20/1 |
| 8,220,710 B2 * | 7/2012 | Hoffman et al. | 235/385 |
| 8,239,291 B2 | 8/2012 | Hoffman et al. | |
| 8,280,546 B2 | 10/2012 | D'Andrea et al. | |
| 8,280,547 B2 | 10/2012 | D'Andrea et al. | |
| 8,311,902 B2 * | 11/2012 | Mountz et al. | 705/28 |
| 8,392,019 B2 * | 3/2013 | Segal et al. | 700/242 |
| 8,412,400 B2 | 4/2013 | D'Andrea et al. | |
| 8,425,173 B2 * | 4/2013 | Lert et al. | 414/280 |
| 8,429,004 B2 * | 4/2013 | Hamilton et al. | 705/7.41 |
| 8,444,369 B2 | 5/2013 | Watt et al. | |
| 8,463,431 B2 * | 6/2013 | Segal et al. | 700/237 |
| 8,483,869 B2 | 7/2013 | Wurman et al. | |
| 8,494,673 B2 * | 7/2013 | Miranda et al. | 700/216 |
| 8,532,817 B2 * | 9/2013 | Bacom et al. | 700/214 |
| 8,538,692 B2 | 9/2013 | Wurman et al. | |
| 8,606,392 B2 | 12/2013 | Wurman et al. | |
| 2003/0149644 A1 * | 8/2003 | Stingel et al. | 705/28 |
| 2005/0238465 A1 * | 10/2005 | Razumov | 414/273 |
| 2006/0206235 A1 * | 9/2006 | Shakes et al. | 700/216 |
| 2007/0012693 A1 * | 1/2007 | Kummer | 220/4.27 |
| 2007/0017984 A1 * | 1/2007 | Mountz et al. | 235/385 |
| 2007/0021864 A1 * | 1/2007 | Mountz et al. | 700/216 |
| 2007/0071585 A1 | 3/2007 | Henkel | |
| 2007/0125727 A1 * | 6/2007 | Winkler | 211/59.2 |
| 2007/0125730 A1 * | 6/2007 | McLaughlin et al. | 211/84 |
| 2007/0187183 A1 * | 8/2007 | Saigh et al. | 186/53 |
| 2007/0290040 A1 * | 12/2007 | Wurman et al. | 235/385 |
| 2008/0001372 A1 * | 1/2008 | Hoffman et al. | 280/35 |
| 2008/0077511 A1 * | 3/2008 | Zimmerman | 705/28 |
| 2008/0167884 A1 | 7/2008 | Mountz | |
| 2008/0167933 A1 | 7/2008 | Hoffman | |
| 2008/0228507 A1 * | 9/2008 | Larue et al. | 705/1 |
| 2009/0074545 A1 * | 3/2009 | Lert et al. | 414/276 |
| 2009/0185884 A1 * | 7/2009 | Wurman et al. | 414/270 |
| 2009/0196715 A1 * | 8/2009 | Rebstock | 414/222.01 |
| 2010/0061833 A1 | 3/2010 | Winkler | |
| 2010/0171826 A1 * | 7/2010 | Hamilton et al. | 348/135 |
| 2010/0316468 A1 * | 12/2010 | Lert et al. | 414/273 |
| 2010/0316470 A1 * | 12/2010 | Lert et al. | 414/273 |
| 2011/0153063 A1 | 6/2011 | Wurman et al. | |
| 2011/0167377 A1 * | 7/2011 | Bass et al. | 715/780 |
| 2011/0264259 A1 * | 10/2011 | Boyer et al. | 700/218 |
| 2012/0004769 A1 * | 1/2012 | Hallenbeck et al. | 700/232 |
| 2012/0029691 A1 * | 2/2012 | Mockus et al. | 700/232 |
| 2012/0045301 A1 * | 2/2012 | Rebstock | 414/267 |
| 2012/0078412 A1 * | 3/2012 | Mockus et al. | 700/230 |
| 2012/0123587 A1 * | 5/2012 | Mockus et al. | 700/230 |
| 2012/0143427 A1 | 6/2012 | Hoffman et al. | |
| 2012/0189409 A1 * | 7/2012 | Toebes et al. | 414/273 |
| 2012/0282070 A1 | 11/2012 | D'Andrea et al. | |
| 2012/0298688 A1 * | 11/2012 | Stiernagle | 221/155 |
| 2012/0303154 A1 * | 11/2012 | Stiernagle | 700/214 |
| 2012/0330458 A1 * | 12/2012 | Weiss | 700/216 |
| 2013/0054005 A1 | 2/2013 | Stevens et al. | |
| 2013/0103552 A1 | 4/2013 | Hoffman et al. | |
| 2013/0110281 A1 * | 5/2013 | Jones et al. | 700/228 |
| 2013/0121792 A1 * | 5/2013 | van der Meulen et al. | 414/217 |
| 2013/0173049 A1 | 7/2013 | Brunner et al. | |
| 2013/0302132 A1 | 11/2013 | D'Andrea | |

FOREIGN PATENT DOCUMENTS

| | | |
|---|---|---|
| JP | 2000214928 | 8/2000 |
| JP | 2010514646 | 5/2010 |

OTHER PUBLICATIONS

Guizzo, "Three Engineers, Hundreds of Robots" IEEE Spectrum, Jul. 2008, url: http://spectrum.ieee.org/robotics/robotics-software/three-engineers-hundreds-of-robots-one-warehouse.*

Madrigal, "Autonomous Robots Invade Retail Warehouse" Jan. 27, 2009, url: http://www.wired.com/wiredscience/2009/01/retailrobots/.*

Notification of Transmittal of the International Search Report and The Written Opinion of the International Searching Authority, or the Declaration, International application No. PCT/US13/62786, 8 pages, Aug. 18, 2014.

Kator, "A DC Like No Other," [online] Modern Materials Handling 62.7 (Jul. 1, 2007), 33, [retrieved on Jan. 13, 2013] Retrieved from ProQuest, URL:http://search.proquest.com/professional/docview/1061544695?accountid=157282og, 1 to p. 2, Jul. 1, 2007.

Wurman, et al. "Coordinating Hundreds of Cooperative, Autonomous Vehicles in Warehouses" AI Magazine Spring 2008, vol. 29, No. 1, [online] Association for the Advancement of Artificial Intelligence (AAAI), [retrieved on Jan. 6, 2013] Retrieved from <htttp:aaalpress.org/ojs/index.php/aimagaze/article/viewFile/2082/1982>, entire document especially Figures 2-3 and 5 and p. 13, col. 1-p. 18 col. 1, Jul. 1, 2007.

Napolitano, "Mobility has arrived: mobile and wireless technology is making a measurable impact on today's warehouse & DC operations. Savvy users are going multi-model, pulling multiple technologies and software capabilities together to increase productiviy, cut pick-rate errors, and increase iinventory accuracy." [online] Logistics Management (Highlands Ranch, http://search.proquest.com/professional/docview/1065920381?accountid=157282 > entire document, Feb. 2012.

Communication from the Japanese Patent Office; Notice of Reasons for Rejection for Appl. No. 2015-535727; receipt date May 12, 2016.

Communication from the European Patent Office; Extended European Search Report for Appl. No. 13844896.4 dated May 25, 2016; 9 pages.

(56) References Cited

OTHER PUBLICATIONS

Communication pursuant to Article 94(3) EPC for Appl. No. 13 844 896.4-1731; dated Jan. 13, 2017; reported Feb, 2, 2017; 6 pages.

* cited by examiner

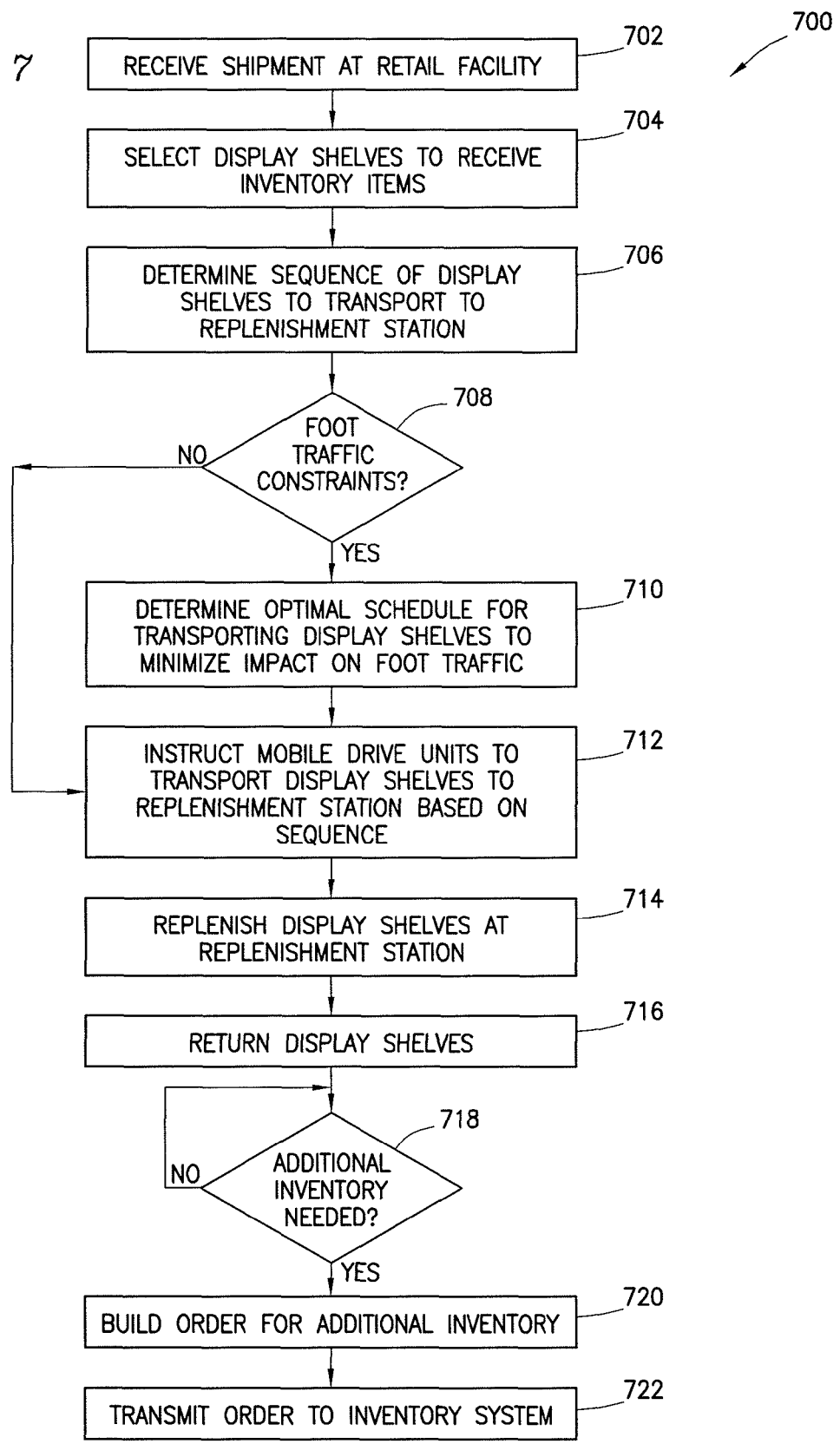

REPLENISHING A RETAIL FACILITY

BACKGROUND OF THE INVENTION

Modern inventory systems, such as those in distribution warehouses, mail-order warehouses, and custom-order manufacturing facilities, face significant challenges in responding to requests for inventory items. Likewise, retail facilities face significant challenges in restocking display shelves in a timely and efficient manner. As a result, efficient use of time, space, and system resources can be crucial to successful operation and management of an inventory system, particularly where inventory items in the inventory system are packaged for shipment to a retail facility to restock display shelves of the retail facility.

BRIEF DESCRIPTION OF THE DRAWINGS

For a more complete understanding of the present invention and its advantages, reference is now made to the following description, taken in conjunction with the accompanying drawings, in which:

FIG. 7 is a flowchart representing an example embodiment of operation of a remote facility capable of replenishing inventory holders with inventory items from arranged orders.

DESCRIPTION OF EXAMPLE EMBODIMENTS

Figure 1:
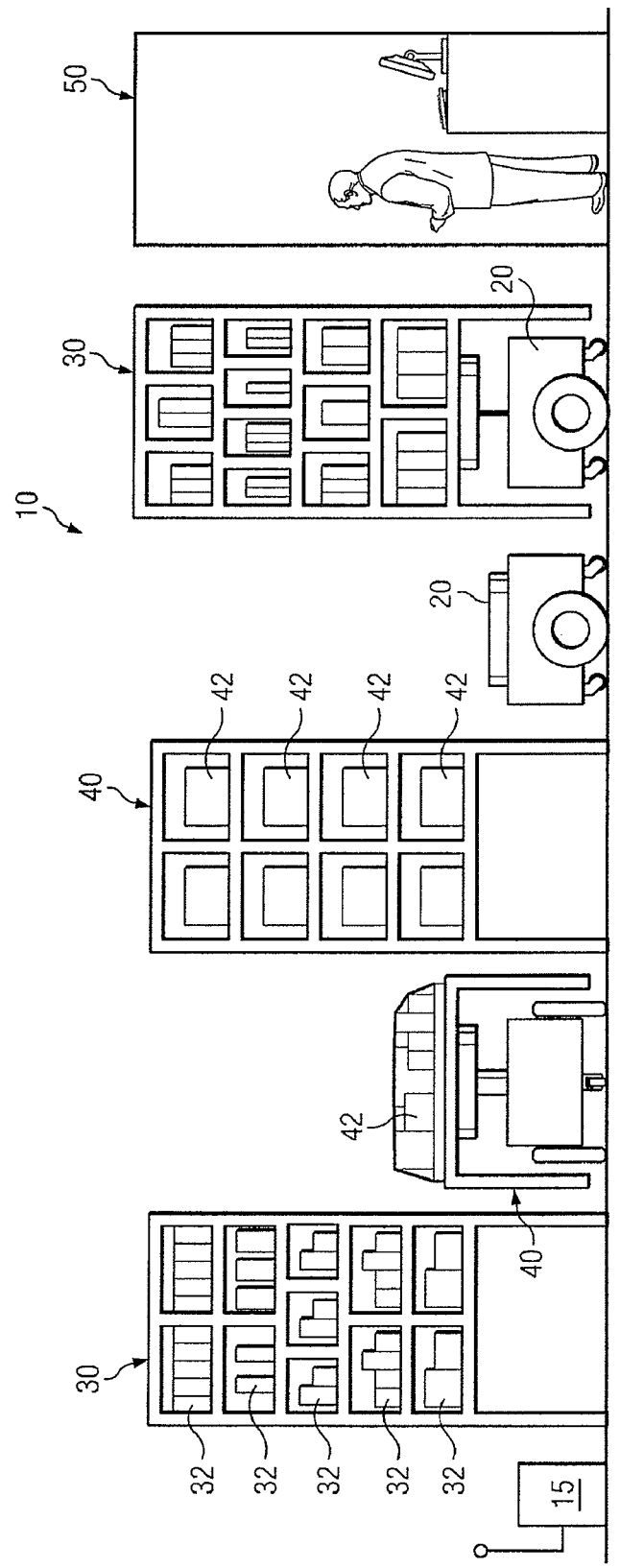
FIG. 1 illustrates components of an inventory system according to a particular embodiment.

A retail facility, such as a grocery store or merchandise warehouse, typically displays inventory for consumers to purchase on various shelves of the facility. In order to facilitate the consumer shopping experience, the shelves may be arranged into aisles and items may be organized by group and subgroup within the shelves. For example, a typical grocery store may include a baking goods aisle and a canned goods aisle, among others. The baking aisle typically includes various groups of baking goods such as sugar, flour, and spices. Likewise, the canned goods aisle typically includes various groups of canned goods, such as vegetables, fruits, and soup. As the inventory within the retail facility is purchased by consumers, the retail facility places orders to replace its depleted inventory, usually from one or more distribution warehouses.

Distribution warehouses may store bulk quantities of replacement inventory and typically store sufficient quantities to fulfill orders for multiple retail facilities at various locations. The distribution warehouse may include an inventory system for fulfilling orders for replacement inventory. Such inventory systems typically include various racks of shelves that store bulk inventory items. When an order for inventory items is placed, a worker retrieves inventory from the shelves storing the items on the order, and takes the inventory items to an order processing station to assemble the order for shipment.

When a shipment fulfilling an order for replacement inventory is received from the distribution warehouse by the retail facility, workers typically unpack the shipping containers and replenish the inventory on the shelves. It is undesirable to conduct such activities while consumers are shopping because restocking and/or replenishment activities may interfere with customer activities. Such establishments may desire to minimize the amount of time required to complete those restocking and/or replenishment activities in order to minimize the impact on customer activities. As a result, restocking and/or replenishing inventory may be difficult, inconvenient, and/or time sensitive. Restocking and/or replenishment may, for example, be limited to particular time windows when foot traffic is minimal. Such windows may be small in today's retail facilities, many of which are now open 24 hours a day. In addition, retail facilities continue to grow in size and tend to include an increasing number and variety of inventory items. These changing conditions make the problem of minimizing the impact of replenishment activities on the consumer shopping experience an increasingly non-trivial task.

Certain embodiments of the inventory systems of the present disclosure may address these difficulties. In particular, an inventory system is provided to arrange how inventory items in one or more orders are packed for shipment to a remote facility, such as a grocery store or merchandise warehouse. The arrangement of the inventory items in the shipment may be calculated such that inventory items may be unpacked at the remote facility for replenishment activities according to the order in which the items should be placed onto the shelves. For example, based on the layout of a particular grocery store, an inventory system may determine that a shipment should be arranged such that the items for the baking aisle are to be unloaded first, followed by items on the canned goods aisle. As another example, a retail facility may arrange inventory in the baking aisle by flour first, followed by sugar, followed by spices. Accordingly, the inventory system may arrange for packing the shipment by first packing spices, then sugar, then flour. Thus, the shipment may be unpacked according to the order that items appear on the aisle of the retail facility. In addition, a mobile drive unit may be deployed at the remote facility to transport the shipments to the correct locations in the correct order in the aisles for unloading the items. For example, mobile drive units may be self-powered robotic devices configured to move independently within a warehouse or retail facility. The mobile drive units may be capable of lifting shipment containers, inventory holders, display shelves, or other containers of inventory items and transporting those components to inventory stations and other locations within the warehouse or retail facility. In some systems, a mobile drive unit may scan shelves for additional depleted inventory and place an order for additional inventory from the distribution center.

In some embodiments of the present disclosure, the retail facility may include additional mobile drive units that are capable of transporting display shelves of the retail facility to a restocking station where the shelves may be restocked with inventory items from, for example, an arranged shipment. In such embodiments, the shipment may be arranged based on an optimal sequence in which to transport the display shelves to the restocking station. To illustrate, it may be desirable to stock the shelf holding flour first, then the shelf holding sugar, then the shelf holding spices. The order may thus be arranged such that spices are packed first, then sugar, then flour. The sequence in which the display shelves are moved may be calculated to minimize the impact on shopping and other consumer activities. For example, the shelves may be scheduled to be transported at particular times when foot traffic is expected to be minimal.

In some embodiments, when shipments are received, they may be broken down into individual or smaller groups of inventory items and placed into temporary storage shelves in a back room or storage area of the retail facility. Mobile drive units may be capable of transporting the storage shelves within the back room or storage area. For example, mobile drive units may transport temporary storage shelves from an unloading area to another location in the storage area after the shelves receive items from the shipment. A management module may track the location of the replacement inventory items within the storage shelves. Thus, when the management module determines to replenish one or more display shelves that are empty or low on inventory items due to sales in the retail portion of the retail facility, the management module may issue instructions to one mobile drive unit to transport the appropriate temporary storage shelf holding one or more of those inventory items to the restocking station. The management module may also issue instructions to another mobile drive unit to transport the display shelf to the restocking station. Accordingly, restocking activities at the retail facility may proceed in a timely and efficient manner.

To provide a system that allows for optimal order unpacking at the remote facility, the inventory system may include a management module that determines an optimal packing order for a given order based on the particular layout of the remote facility originating the order. When optimizing a packing order, the management module may also take into account various aspects of the inventory goods, such as size, shape, weight, and crushability. The management module may optimize the placement of inventory items onto a pallet for shipment. In order to fulfill the order, mobile drive units may be assigned tasks to transport inventory holders storing inventory items to an inventory station. A worker or automated equipment at the inventory station may remove the desired inventory item from the inventory holder and pack the inventory item for shipment. Thus, orders may be packed in an optimal order to provide for optimal unpacking at the remote facility.

Technical advantages of certain embodiments of the present invention include the ability to provide a system and method for arranging an order to be packed according to an optimal unpacking sequence. In some embodiments, a technical advantage may include the ability to determine an optimal unpacking sequence for a remote facility and/or determine an optimal order packing arrangement. Because inventory items may be packed according to the order packing arrangement, a technical advantage may include the ability to unpack orders at the facility in a more timely, predictable, and/or efficient manner. For example, an order may be unpacked according the manner in which inventory is stored on the shelves of the remote facility. Accordingly, the time and/or costs of restocking the remote facility may be minimized. Further technical advantages of certain embodiments of the present invention may include providing a flexible and scalable inventory storage solution that can be easily adapted to accommodate system growth and modification. Further technical advantages of certain embodiments of the present invention may include providing a flexible and scalable inventory storage solution that can be easily adapted to accommodate system growth and modification. Other technical advantages of the present invention will be readily apparent to one skilled in the art from the following figures, descriptions, and claims.

While specific advantages have been enumerated above, various embodiments may include all, some, or none of the enumerated advantages. Embodiments of the present invention and its advantages are best understood by referring to FIGS. 1 through 8, wherein like numerals refer to like and corresponding parts of the various drawings.

FIG. 1 illustrates an inventory system 10 according to a particular embodiment of the present invention. Inventory system 10 includes a management module 15, one or more mobile drive units 20, one or more inventory holders 30, one or more container holders 40, and one or more inventory stations 50. In general, management module 15 manages the administration and coordination of the various elements of system 10 in order to fulfill orders received by system 10. Management module 15 may determine and/or obtain, for example, an optimal unpacking order at a remote facility. Based on the optimal unpacking sequence, management module 15 may determine an optimal arrangement for packing the items into shipping containers 142. Management module 15 may then administer and coordinate various tasks calculated to assemble inventory items 32 in the orders according to the optimal pack arrangement. In response to commands communicated by management module 15, mobile drive units 20 may transport inventory holders 30 and container holders 40 to various locations within inventory system 10, such as inventory stations 50. In some embodiments, inventory system 10 may arrange and fulfill orders received by inventory system 10 according to an optimal unpacking sequence at a remote facility.

A more detailed description of how inventory system 10 may be utilized to determine an optimal order arrangement will be explained in detail below with respect to FIGS. 2 through 7.

Figure 2:
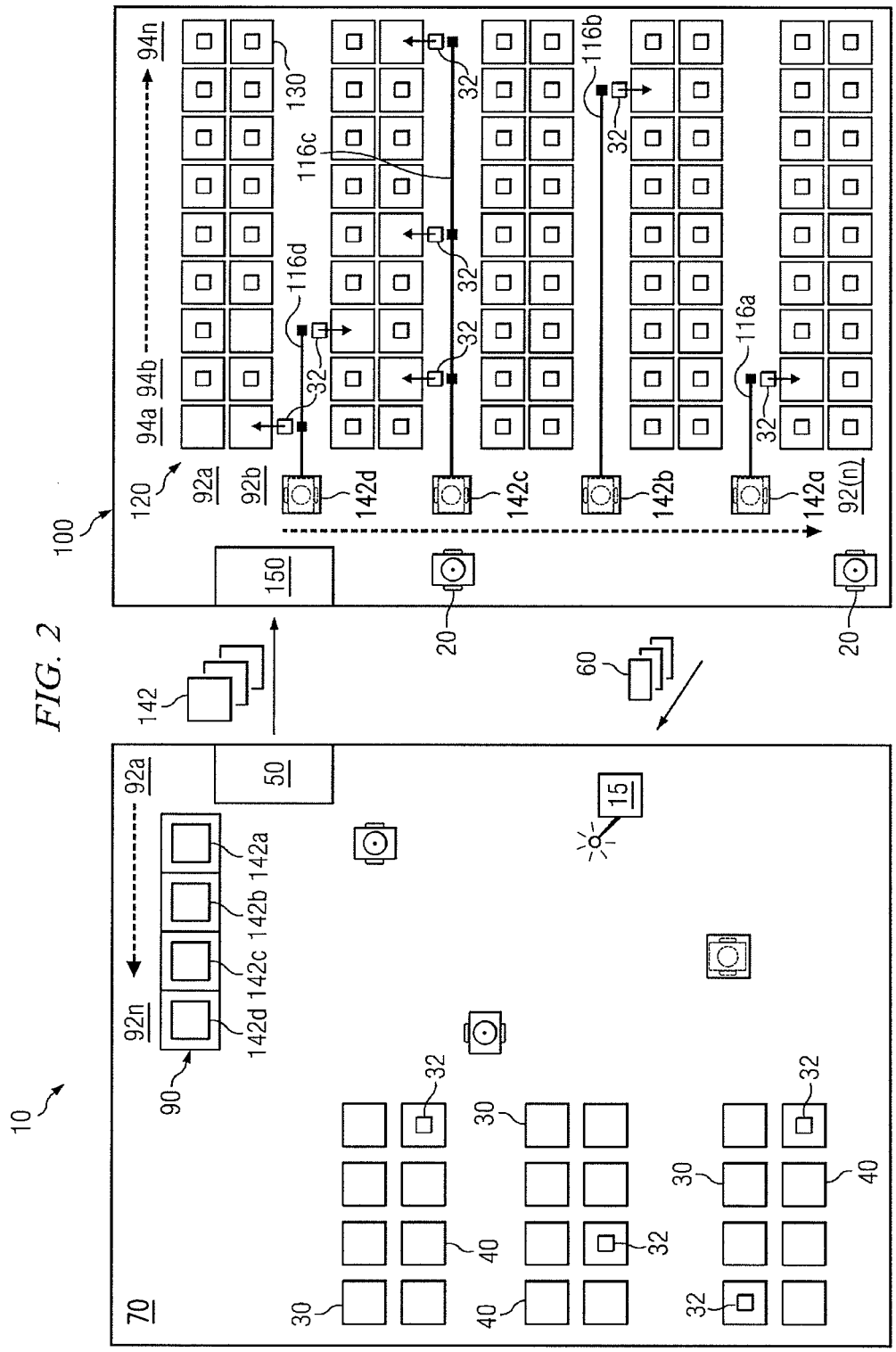
FIG. 2 is an example embodiment of an inventory system capable of arranging orders for a remote facility.

Management module 15 receives and/or generates requests and may initiate particular operations involving mobile drive units 20, inventory holders 30, inventory items 32, container holders 40, containers 42, inventory stations 50, and/or other elements of inventory system 10. Management module 15 may select components of inventory system 10 to perform these operations and communicate commands, instructions, and/or other appropriate information to the selected components to facilitate completion of these operations. Although the description below focuses on embodiments of inventory system 10 that receive operation requests 60 (such as orders 60 as illustrated in FIG. 2) from other components of inventory system 10, management module 15 may receive requests 60 from any appropriate system or component, and may alternatively or additionally generate such requests itself using any appropriate techniques.

Mobile drive units 20 move inventory holders 30 between locations within a workspace associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered robotic devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such embodiments, mobile drive units 20 may receive power through a connection to the guidance elements, such as a powered rail.

Mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, some embodiments of mobile drive unit 20 may communicate with management module 15 and/or with one another using Wi-Fi (IEEE 802.11), Bluetooth (IEEE 802.15), Infrared Data Association standards, or any other appropriate wireless communication protocol. As another example, in a tracked inventory system 10, tracks or other guidance element upon which mobile drive units 20 move may be wired to facilitate communication between mobile drive units 20 and other components of inventory system 10.

Inventory holders 30 store inventory items 32. In some embodiments, inventory holders 30 include multiple storage bins with each storage bin capable of holding a different type of inventory item 32. Inventory holders 30 are capable of being carried, rolled, or otherwise moved by mobile drive units 20. In some embodiments, inventory holder 30 may provide additional propulsion to supplement that provided by mobile drive unit 20 when moving inventory holder 30. Additionally, in particular embodiments, each inventory holder 30 may have a plurality of faces, and each bin may be accessible through specific faces of the relevant inventory holder 30. Mobile drive units 20 may be configured to rotate inventory holders 30 at appropriate times to present particular faces of inventory holders 30 and the associated bins to an operator or other components of inventory system 10.

Inventory items 32 represent any objects suitable for storage, retrieval, and/or processing in an automated inventory system 10. For the purposes of this description, "inventory items" may represent any one or more objects of a particular type that are stored in inventory system 10. As one example, inventory system 10 may represent a retail distribution warehouse that stores bulk inventory items 32 for retail facilities, such as grocery stores and/or merchandise warehouses. As another example, inventory system 10 may represent a mail order warehouse facility, and inventory items 32 may represent merchandise stored in the warehouse facility. During operation, mobile drive units 20 may retrieve inventory holders 30 containing one or more inventory items 32 requested in an order to be packed for delivery to a customer. Moreover, in particular embodiments of inventory system 10, boxes containing completed orders may themselves represent inventory items.

Container holders 40 hold containers 42 in which inventory items 32 may be grouped. For example, container holders 40 may be configured to store orders for various inventory items 32. Container holders 40 may have any appropriate structure and be configured to store containers 42 in any suitable manner based on the type of containers 42 utilized in inventory system 10 or any other appropriate factors. In some embodiments, container holders 40 represent a type of inventory holder configured to carry pallets and that can be moved by mobile drive units 20. Container holders 40 may include one or more platform or shelves on which containers 42 rest. Additionally or alternatively, container holders 40 may include a plurality of bins each holding containers 42 of a different size or type.

Containers 42 represent any appropriate form of container into or onto which inventory items 32 can be placed for storage, shipping, or other appropriate purposes. Examples of containers 42 include, but are not limited to, boxes, pallets, bins, totes, cartons, and envelopes. In particular embodiments, containers 42 are independent of the container holders 40 in which containers 42 are stored, and as a result, containers 42 may be removed from container holders 40 for processing or transferred to other container holders 40. As one example, containers 42 may represent boxes in which or pallets on which inventory items 32 associated with a particular order may be stored for delivery, and the relevant container 42 may then be shipped to a customer associated with that order. As another example, containers 42 may represent bins or other containers in which inventory items 32 may be placed for long term storage and then moved to a special location or removed from inventory system 10.

Figure 5:
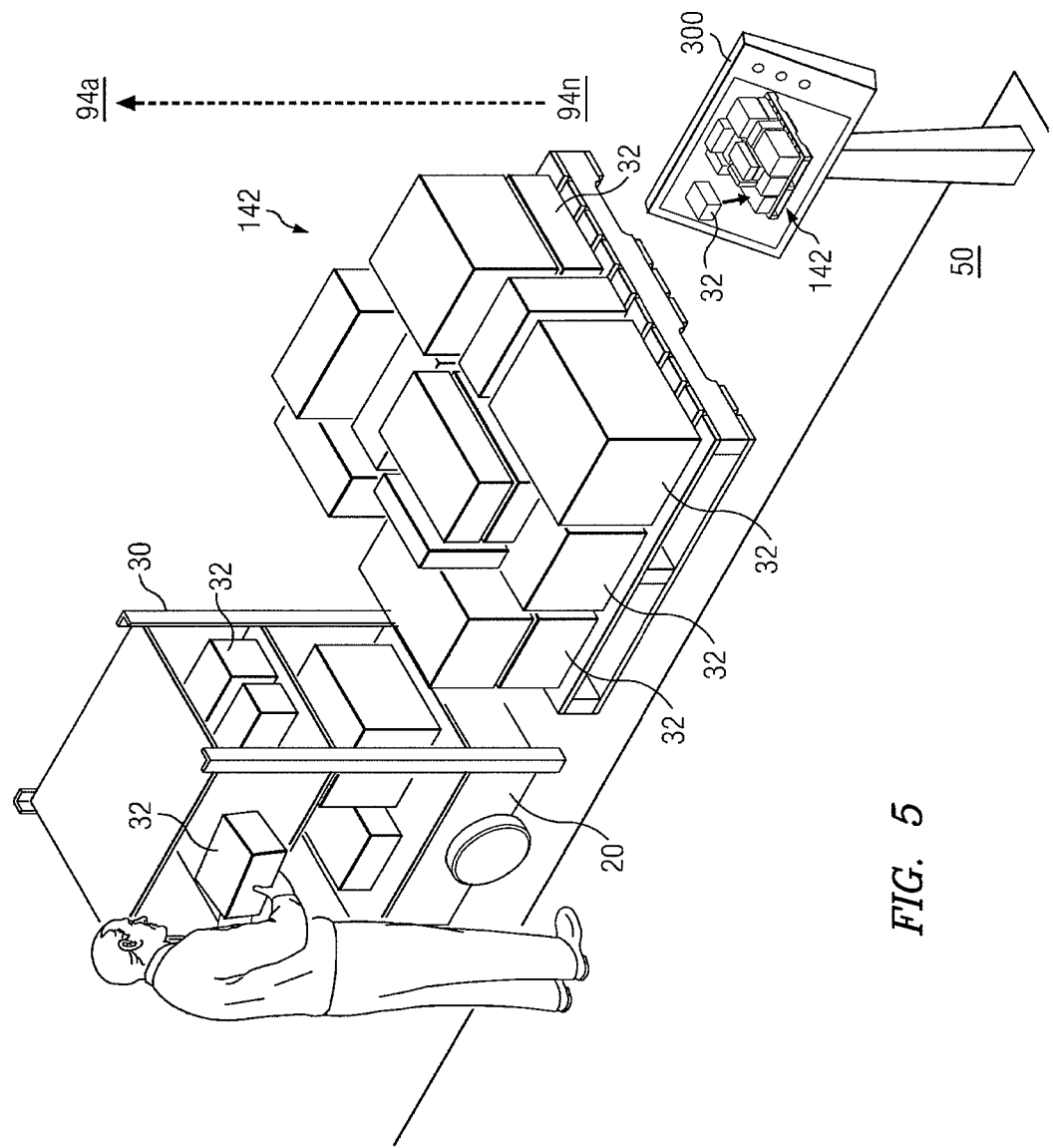
FIG. 5 is a perspective drawing illustrating an example embodiment of packing an order in a container.

Container holders 40 designated for shipment to a remote facility may be referred to herein as shipping containers 142. An example embodiment of a shipping container 142 is illustrated in FIG. 5. In addition or in the alternative, shipping containers 142 may represent one or more containers 42.

Inventory stations 50 may also represent any appropriate components for processing or handling inventory items 32, such as scanners for monitoring the flow of inventory items 32 in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items 32, such as packing or counting inventory items 32, as part of the operation of inventory system 10.

Although "inventory station" as used in the following description refers to locations at which any appropriate processing operation supported by inventory system 10 may be completed, particular embodiments of inventory system 10 may include specialized inventory stations 50 suitable for performing only a single processing task supported by inventory system 10. Moreover, a particular embodiment of inventory system 10 may include inventory stations 50 that are, in general, capable of handling multiple types of operation requests 60 but, at any given time, configured to handle only one particular type of operation requests 60.

FIG. 2 is an overhead view of an example embodiment of an inventory system 10 capable of arranging orders for a remote facility 100. Inventory system 10 includes various elements described above with respect to FIG. 1 that are arranged in a workspace 70. In some embodiments, inventory system 10 represents a distribution warehouse, while remote facility 100 represents a retail facility that exchanges goods and/or services with consumers. For example, remote facility 100 may represent a grocery store or merchandising facility. Generally, management module 15 receives orders 60 for various inventory items 32, determines that the orders 60 are associated with remote facility 100, and determines an optimal packing arrangement for the inventory items 32 needed to fulfill the orders 60 based on a layout 120 of remote facility 100. Inventory system 10 then coordinates the movement of the various elements of inventory system 10 to fulfill the order such that the orders are packed into shipping containers 142 according to the optimal packing arrangement. For example, mobile drive units 20 may transport inventory holders 30 and/or container holders 40 to inventory station 50 in an appropriate sequence so that shipping containers 142 may be packed according to the packing arrangement. In some embodiments, the sequence may, depending on various factors, control, guide, and/or determine the packing of shipping containers 142 such that inventory items 32 that should be unpacked last at remote facility 100 are packed first at inventory station 50.

Workspace 70 of inventory system 10 represents an area associated with inventory system 10 in which mobile drive units 20 can move, inventory holders 30 and container holders 40 can be stored and/or orders 60 can be assembled into shipping containers 142 at inventory stations 50. For example, workspace 70 may represent all or part of the floor of a distribution center in which inventory system 10 operates. Moreover, although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or arbitrary geometry.

Facility 100 represents any appropriate facility remote from system 10 for storing, distributing, and/or selling inventory items 32. Facility 100 may represent a retail facility such as a grocery store, hardware store, warehouse, or other establishment that sells various inventory items 32 or other goods. Facility 100 may receive shipping containers 142 of inventory items 32 at various times from inventory system 10. In such embodiments, inventory system 10 may represent a wholesale distribution center or other warehouse for managing inventory items 32. In other embodiments, facility 100 may be any particular system for storing inventory items 32. While in the illustrated embodiment facility 100 is illustrated as being remote from system 10, that need not necessarily be the case. For example, in some embodiments, facility 100 could represent a portion of inventory system 10 and/or be physically proximate to inventory system 10.

Facility 100 includes various inventory holders 130 and a staging area 150. Inventory holders 130 may be arranged according to a particular layout 120. As illustrated, layout 120 of inventory holders 130 of remote facility 100 is arranged in aisles 92a to 92n within facility 100. Each aisle 92 of inventory holders 130 may hold various types of inventory items 32. Aisles 92 may be divided into sections 94, with each section 94 holding one or more particular subtypes of inventory items 32. For example, a grocery store or merchandising warehouse may display various goods for consumer purchase on shelves 130 arranged into aisles 92. Goods may be arranged by type and various subtypes in a manner typical to such stores. For example, a grocery store may include, among others, a baking aisle 92 and a canned goods aisle 92. Sections 94a to 94n may represent a section of each aisle that holds a particular subtype of inventory item 32. For example, on a baking goods aisle 92, section 94a may store flour, section 94b may store sugar, and section 94n may store spices. As another example, on a canned goods aisle 92, vegetables may be stored in section 94a, fruits may be stored in section 94b, and soups may be stored in section 94n.

It should be noted that while remote facility 100 is illustrated as including aisles 92 having sections 94 of a particular layout and geometry, it is contemplated that facility 100 may have any appropriate layout and geometry. Moreover, while a specific illustration has been provided by way of example, the concepts of the present disclosure may apply to any number and/or types of facilities 100 storing various types and categories of inventory items 32. Accordingly, while facility 100 is illustrated as arranging inventory items 32 into aisles 92 having sections 94, facility 100 may be arranged in any appropriate layout 120 having any appropriate arrangements and/or geometries of inventory items 32 within inventory holders 130.

Layout 120 may, in some embodiments, be encoded in a computer readable medium as virtual map of inventory 32 within facility 100. Layout 120 may be obtained, stored, and/or received by management module 15 to facilitate filling orders 60 associated with facility 100. For example, layout 120 may be information modeled in a Computer Aided Design (CAD) document or other electronic modeling tool. In some embodiments, layout 120 may be developed at a workstation computer, management module, or other electronic interface at facility 100, system 10, or other location. In some embodiments, management module 15 may be used to develop layout 120 using an appropriate interface.

Inventory holders 130 represent any appropriate holder, shelf, rack, receptacle, or any combination thereof appropriate for holding inventory items 32 at facility 100. For example, inventory holders 130 may represent various display shelves and/or may be arranged in aisles 92 within facility 100. In some embodiments, inventory holders 130 may be similar to and/or the same as inventory holders 30 as discussed above. Inventory holders 130 may be configured to present inventory items 32 to customers and/or patrons of facility 100 for sale and/or use. While depicted as discrete components, inventory holders 130 may represent substantially contiguous racks of shelves within a facility 100.

Staging area 150 represents a location designated for receipt of shipping containers 142 into facility 100. In some embodiments, staging area 150 may represent an inventory station 50 for performing activities similar to those discussed above with respect to inventory stations 50, as appropriate for facility 100. Staging area 150 may, for example, include a loading dock for receiving shipments of containers 142 corresponding to one or more orders. Staging area 150 may be utilized to store various shipping containers 142 containing orders 60 until an appropriate time at which those shipping containers 142 may be unpacked for replenishment and/or restocking inventory holders 130.

In operation, facility 100 engages in normal business operations, in which various inventory items 32 are removed from inventory holders 130 due to sale, use, and/or purchase. Due to the removal of inventory items 32 from inventory holders 130, facility 100 may from time-to-time require restocking and/or replenishment of inventory items 32 within inventory holders 130. As a result, one or more orders 60 may be placed to inventory system 10 including inventory items 32 desired to replenish inventory holders 130 of facility 100.

Once orders 60 are received by inventory system 10, management module 15 may facilitate arranging inventory items 32 of orders 60 into shipping containers 142. Management module 15 may determine and/or obtain an inventory unpacking sequence for remote facility 100. Based on the inventory unpacking sequence, management module 15 may determine an order packing arrangement. The order packing arrangement may control, govern, and/or guide the order in which inventory items 32 in orders 60 should be packed for shipment. Management 15 may then issue various commands, instructions, and or tasks to various components of system 10 to facilitate fulfilling orders 60 according to the order packing arrangement. Inventory system 10 thus facilitates a method by which inventory items 32 may be removed from shipping containers 142 at facility 100 in the same order that they are expected to be placed into inventory holders 130. In some embodiments, management module 15 may determine one or more appropriate replenishment paths 116 for shipping containers 142 to be moved along within facility 100 as they are unpacked. By saving time and/or effort that would otherwise be required to locate the proper aisle 92 and/or section 94 for each inventory item 32 removed from each shipping container 142, facility 100 may accomplish various operational efficiencies and/or time savings associated with restocking and/or replenishment activities.

Management module 15 may determine, obtain, and/or receive an inventory unpacking sequence that is based on the location of various inventory items 32 within inventory holders 130. The inventory unpacking sequence may be based on a determination of an optimal order in which inventory items 32 may be unpacked from various shipping containers 142 and placed into inventory holders 130 based on the location of inventory items 32 in inventory holders 130. An optimal unpacking order may seek to minimize various factors, such as total distance traveled by workers unpacking shipping containers 142 and/or time required to unpack various inventory items 32. In some embodiments, the inventory unpacking sequence includes one or more inventory replenishment paths that define one or more optimal routes that mobile drive units 20 located at facility 100 may take to complete an inventory unpacking sequence. Inventory replenishment paths may be a set of one or more paths that may be determined based on an optimal sequence of unloading inventory items 32. To determine inventory replenishment paths, management module 15 may assume that substantially all sections 94 of facility 100 are being replenished. Once determined, management module 15 may use the inventory unpacking sequence and/or inventory replenishment paths to define an order packing arrangement at system 10. Management module 15 may additionally or alternatively determine one or more particular replenishment paths 116 that correspond to a given order 60 based on the inventory items 32 as arranged in shipping containers 142, the inventory unpacking sequence, and/or generally determined inventory replenishment paths. It should be noted that while replenishment paths are herein discussed as being determined by management module 15, replenishment paths may be determined by any suitable component, such as a separate management module at facility 100.

Management module 15 may, in some embodiments, determine an optimal inventory unpacking sequence based on layout 120 of facility 100. Determining an inventory unpacking sequence may be initiated, for example, by obtaining and/or receiving layout 120 from a workstation at facility 100 or other appropriate location. For example, management module 15 may analyze layout 120 to determine the locations of inventory items 32 on inventory holders 130 within facility 100. In some embodiments, however, management module 15 may receive and/or obtain the inventory unpacking sequence itself from an external source. In some embodiments, management module 15 may receive an inventory unpacking sequence via an electronic interface. In some embodiments, the inventory unpacking sequence may refer to an optimal and/or preferable sequence in which inventory items 32 are unpacked at facility 100. For example, inventory items 32 may be unpacked in the same order that the inventory items 32 are placed in inventory holders 130. In some embodiments, the inventory sequence may be based on determining that shipping containers 142 should be unpacked according to the order in which the rows of inventory 92a to 92n are arranged within that facility. For example, the inventory sequence may be based on unpacking inventory items 32 sequentially from aisle 92n to aisle 92a. In addition or in the alternative, the inventory sequence may be based on unpacking inventory items 32 sequentially by section 94. The inventory sequence may be based on unpacking inventory items 32 sequentially across each row section 94a to 94b. The inventory sequence may take into account unpacking inventory items 32 both by aisles 92 and by sections 94. It should be understood, however, that an inventory sequence need not be based on aisles 92 and sections 94, and that management module 15 may be capable of analyzing any particular layout 120 to determine an appropriate inventory sequence.

In some embodiments, management module 15 may take into account various factors and/or characteristics of facility 100 to determine an appropriate inventory unpacking sequence. In some embodiments, management module 15 may determine an inventory unpacking sequence based on the inventory items 32 relative distance from staging area 150. For example, it may be advantageous to unpack inventory items 32 designated for inventory holders 130 that are further away from staging area 150 earlier than inventory items 32 designated for inventory holders 130 that are closer to staging area 150. Additionally or alternatively, management module 15 may take into account preferences or other factors received from facility 100 when determining an inventory sequence for facility 100.

At various times as appropriate, layout 120 may be transmitted to and/or stored by management module 15. Layout 120 may be transmitted to management module 15 in any suitable manner, such as via a network or other electronic transmission medium. If layout 120 of facility 100 changes or is altered, a new layout 120 may be transmitted and/or stored by management module 15 for analysis. In response to obtaining layout 120, management module 15 may analyze layout 120 in order to determine an optimal inventory unpacking sequence associated with facility 100. In some embodiments, management module 15 may receive and/or obtain the inventory unpacking sequence in a similar manner as described herein with respect to layout 120.

Based on the inventory unpacking sequence, management module 15 may determine an order arrangement for orders 60 associated with facility 100. Management module 15 may receive orders 60 for various inventory items 32, which may be designated for shipment to facility 100. For example, a given order 60 from facility 100 may include various inventory items 32 that are designated for various inventory holders 130 in layout 120. Management module 15 may determine that order 60 is associated with a corresponding inventory unpacking sequence associated with facility 100. Based on the inventory unpacking sequence associated with facility 100, management module 15 may determine an order packing arrangement for one or more orders 60. An order packing arrangement as determined by management module 15 may include the order in which inventory items 32 are packed into one or more containers 142. For example, management module 15 may determine the order packing arrangement based on a relative position in the inventory unpacking sequence of each inventory item 32 on order 60. For example, aisle 92 may include canned goods and the sections 94 of aisle 92 respectively include vegetables, fruit, and soup. The order unpacking sequence may be soup first, then fruit, then vegetables. If an order 60 is received for vegetables and soup, management module 15 may determine that the order packing arrangement should be to pack vegetables first then soup.

Management module 15 may facilitate packing inventory items 32 included on order 60 according to the order packing arrangement. The order packing arrangement may govern, guide, and/or control the order in which inventory items 32 are packed into shipping containers 142 and/or the arrangement of inventory items 32 within shipping containers 142. The order packing arrangement may indicate the sequence in which inventory items 32 of one or more orders 60 may be packed at inventory system 10 for shipment to facility 100. Inventory items 32 may be packed according to the order packing arrangement. The order packing arrangement may be calculated by management module 15 to be an optimal packing arrangement for inventory items 32 on the order 60 such that the shipping containers 142 containing inventory items 32 on orders 60 are unpacked according to an optimal unpacking sequence.

When determining an order packing arrangement, management module 15 may, in some embodiments, take into account various order packing constraints. Order packing constraints may, in some cases, take precedent over the packing order set according to the inventory unpacking sequence. For example, an order packing constraint may indicate that a crushable item may not be placed beneath a heavy item in shipping container 142 even if it is calculated to be needed earlier in the inventory unpacking sequence. A more detailed description of how order packing constraints may be taken into account is discussed below with respect to FIG. 5.

Management module 15 may additionally or alternatively, as part of determining the order packing arrangement, determine how inventory items 32 should physically be arranged and/or oriented within each container 142. For example, management module 15 may take into account the size and shape of each inventory item 32 in order to place an optimal number of inventory items 32 into shipping container 142.

Management module 15 may, in some embodiments, be capable of determining an order packing arrangement that plans to pack multiple containers 142 according to the inventory sequence of facility 100. For example, in the illustrated example, management module 15 determines an order packing arrangement for a given order 60 in which container 142*a* is to be packed with inventory items 32 for inventory holders 130 on aisle 92*n*. Containers 142*b* and 142*c* are to be packed sequentially with inventory items 32 for aisles 92 between 92*n* and 92*a*. Container 142*d* is to be packed with inventory items 32 for aisle 92*a*. According to the order packing arrangement, management module 15 determines the packing order for container 142*a*, followed by container 142*b*, then container 142*c*, and finally container 142*d*. In an additional embodiment, management module 15 may facilitate the fulfillment of order 60 by packing inventory items 32 on containers 142 according to the order in which inventory items 32 appear in sections 94*a* to 94*n*.

Again, while a specific illustration of determining an order packing arrangement has been provided, it should be understood that this example is provided by way of illustration only, and that management module 15 may be capable of determining order arrangements for any given number of orders 60 having any number and quantity of inventory items 32. In addition, management module 15 may be capable of determining order arrangements for any number and types of facilities 100 having any combination of layouts 120. In addition or in the alternative, management module 15 may be capable of an order packing arrangement in which a single container 142*a* is to be packed for filling inventory holders on multiple aisles 92*a* to 92*n*. In such embodiments, management module 15 may determine an order arrangement in which container 142*a* may, for example, be unpacked by section 94*n* to 94*a* on aisle 92*a*, then section 94*a* to 94*n* on aisle 92*b*, and so on as appropriate.

Management 15 may issue various commands, instructions, and or tasks to various components of system 10 to facilitate fulfilling orders 60 according to the order packing arrangement. Management module 15 may issue instructions that facilitate the packing of inventory items 32 for order 60. For example, according to the determined order packing arrangement, management module 15 may assign various tasks to mobile drive units 20 to transport containers 40 and/or 30 containing inventory items 32 for order 60 to inventory station 50. At inventory station 50, management module 15 may assign tasks to pack containers 142 according to the order arrangement. As illustrated, management module first facilitates packing container 142*a*, then container 142*b*, then container 142*c*, and then container 142*d*. Within each container 142, management module 15 may facilitate packing individual inventory items 32.

A more detailed explanation of how management module 15 may facilitate packing individual inventory items 32 in a given shipping container 142 is explained in further detail below with respect to FIG. 5. Various techniques that may be utilized by inventory system 10 to facilitate packing orders 60 for shipment, including drifting. For example, management module 15 may facilitate the fulfillment of orders 60 utilizing one or more drift spaces and/or queues associated with inventory station 50. For example, management module 15 may utilize drift spaces to facilitate enforcement of one or more packing constraints.

Once containers 142*a* to 142*d* are completed, each container 142 of order 60 may be transported from inventory system 10 to facility 100 in any suitable manner. In some embodiments, order 60 may not be shipped all at once. Rather, containers 142 may be shipped as each container 142 is completed. In some embodiments, containers 142 may be placed into a common shipment for delivery to facility 100. Facility 100 may accept the portion of order 60 included in containers 142 as it is received at staging area 150. Then, each container 142 may be moved to its respective aisle 92. As each container 142 is unpacked, inventory items 32 may be removed from each container 142 such that the first inventory items 32 to be removed from each container 142 may be placed in the appropriate section 94 of the aisle 92. As inventory items 32 are removed from each container 142, those inventory items 32 may sequentially be placed in sections 94*a* to 94*n* or otherwise as appropriate. Thus, when shipping containers 142 representing inventory items 32 on order 60 are unpacked at facility 100, inventory items 32 may be removed in order of the inventory unpacking sequence corresponding to layout 120 of inventory items 32 within facility 100. In some embodiments, management module 15 may, based on the arrangement of packed inventory items 32 within containers 142 and/or layout 120, determine particular replenishment paths 116 for each shipping containers 142 at remote facility 100. Replenishment paths 116 may direct movement of the shipping containers 142 within the remote facility as the shipment is unloaded. In addition or in the alternative, replenishment paths 116 may determine an order in which shipping containers 142 may be unloaded. For example, management module 15 may transmit instructions to components of facility 100 to move containers 142 along particular paths 116 within facility 100 for replenishment. The instructions may include a selection of a particular shipping container 142 to unload first as well the order in which other shipping containers 142 should subsequently be unloaded. Additionally or in the alternative, shipping containers 142 may proceed on a given replenishment path 116 at substantially the same time and/or at a time independent of the unloading of other shipping containers 142.

Replenishment paths 116 may be calculated such that inventory items 132 may be removed at the appropriate aisle 92 and section 94 according to the inventory unpacking sequence. Accordingly, the instructions may include when to slow and/or stop at various points along paths 116 that correspond to the sections 94 where inventory items 32 in containers 142 should be moved to an appropriate inventory holder 130. In some embodiments, path 116b may move forwards and backwards on a given aisle 94 based on inventory items 32 packed according to an order packing constraint. Mobile drive unit 20 may accordingly move forward and backwards on path 116b. For example, path 116b may travel forwards to an inventory holder 130 containing relatively more fragile items 32 that were packed later in the order arrangement before moving backwards to an inventory holder 130 containing relatively less fragile items 32 that were packed earlier in the order arrangement. In some embodiments, facility 100 may include one or more mobile drive units 20 that may receive the instructions. Based on the instructions, the mobile drive units 20 may transport the shipping containers 142 along replenishment path 116. Mobile drive 20 unit may stop where appropriate along each path, such as each point along the path 116 at which one or more inventory items 132 should be removed from container 142. In some embodiments, mobile drive unit 20 may provide some audio and/or visual indication that container 142 includes inventory items 132 that are to be unloaded at each stopping point on path 116.

In some embodiments, mobile drive unit 20 may include appropriate imaging and/or sensing equipment operable to detect the presence of inventory items 32 in inventory holders 130. As mobile drive unit 20 moves along replenishment path 116, mobile drive unit 20 may detect inventory items 32. Mobile drive unit 20 may compare the amount of detected inventory items 32 to a predetermined threshold amount of inventory items 32. If the amount of detected inventory items 32 is below the threshold, the mobile drive unit 20 may initiate an order 60 to inventory system 10. Alternatively or additionally, mobile drive unit 20 may notify management module 15 or other appropriate components of facility 100 of the quantity of inventory items 32 in inventory holder 130. In response, management module 15 may place an order 60 for an additional quantity of inventory items 32. Mobile drive unit 20 may transmit information indicating the quantity of inventory items 32 needed by facility 100 to a wireless access point or other network component capable of communicating the information to management module 15 over a network connection. For example, a management module similar to management module 15 located at facility 100 may receive the information and place an order 60 if additional inventory items 32 are needed. Based on order 60 received from facility 100, management module 15 may instruct the components of inventory system 10 to fulfill order 60 according to the aforementioned techniques. In some embodiments mobile drive unit 20 may be configured to traverse other paths within facility 100 to determine the amounts of various inventory items 32 in inventory holders 130. For example, mobile drive units 20 may traverse such paths at times when foot-traffic is calculated to be at a minimum.

In some embodiments, facility 100 may include a point-of-sale system or other appropriate system that tracks inventory items 32 within facility 100. The point-of-sale system may, for example, monitor inventory levels in inventory holders 130. Replenishment orders 60 may be made based on expected inventory amounts in inventory holders 130 based on sales of inventory items 32 through the point-of-sale system. When inventory levels fall below some predetermined threshold, that may trigger a replenishment order 60 for additional inventory items 32. Mobile drive units 20 may be employed to detect actual inventory items 32 in inventory holders 130, which may be compared to the expected amount of inventory items 32 to ensure that the expected amount of inventory matches the actual amount of inventory.

In retail facilities, it is common for inventory items 32 to be shelved incorrectly and/or misplaced within the facility. For example, shoppers may decide not to purchase a particular item and may place the item on a nearby shelf rather than return the item to the correct location in the store. Accordingly, in some embodiments, mobile drive unit 20 may detect inventory items 32 in inventory holders 130 and/or other locations in facility 100 to determine misplaced or missing inventory items 32. Mobile drive 20 may scan inventory items 30 in a particular inventory holder 130 or other location using a camera or appropriate photo detectors. Image processing or other appropriate signal analysis may be used by the mobile drive unit 20 and/or a management module to determine if inventory items 32 in inventory holder 130 match the type of inventory items 32 expected for that inventory holder 130. If the inventory item 32 does not match, the mobile drive unit 20 and/or a management module 15 may determine a correct inventory holder 30 to which inventory item 32 belongs. Additionally or alternatively, mobile drive unit 20 may provide an appropriate message and/or signal to indicate to a worker or other component of facility 100 the location of the misplaced and/or missing inventory item 32.

Figure 3:
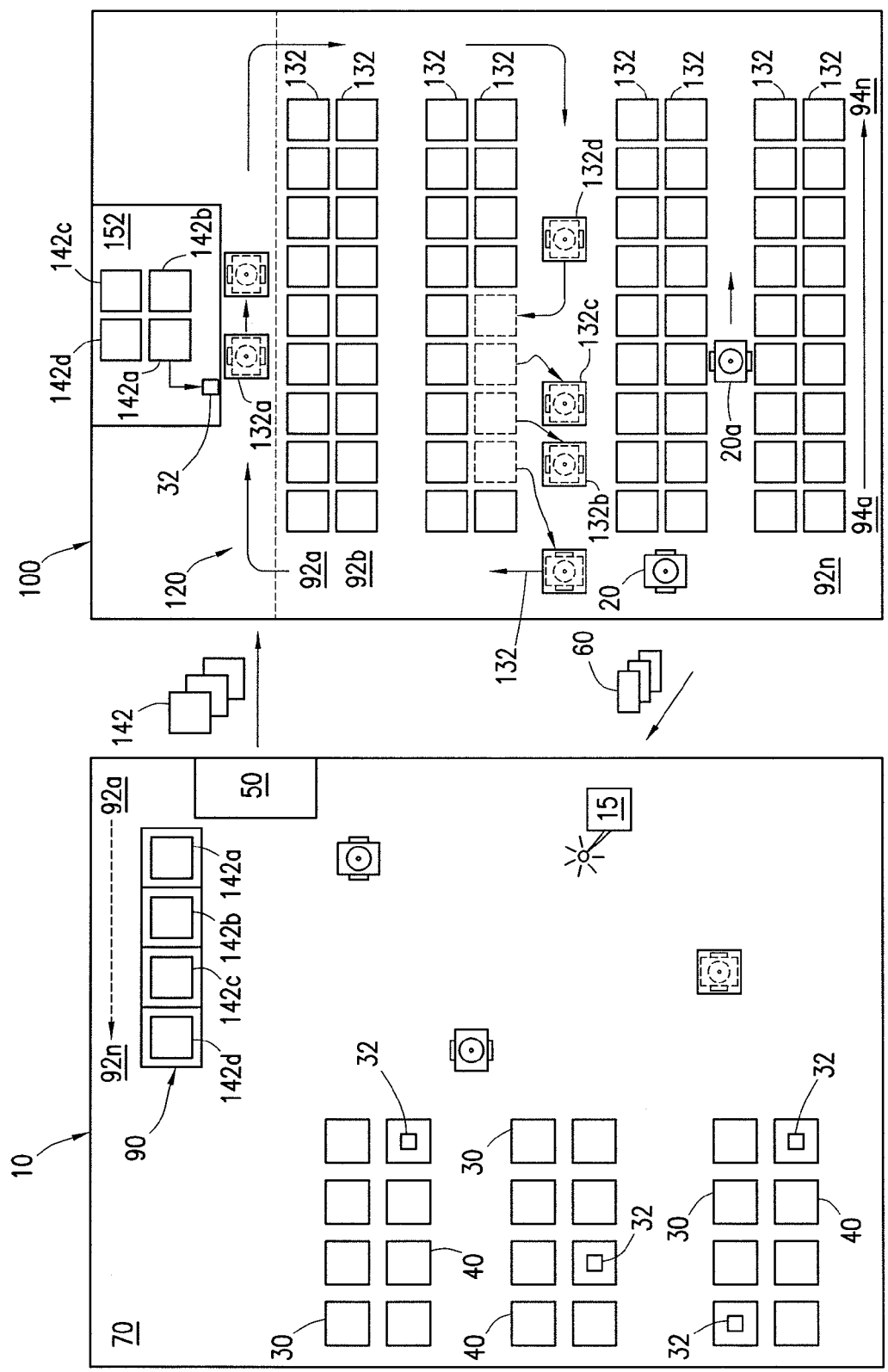
FIG. 3 is another example embodiment of an inventory system capable of arranging orders for a remote facility.

FIG. 3 is another example embodiment of an inventory system 10 capable of arranging orders for a remote facility 100. Inventory system 10 may operate in a similar manner as described above with respect to FIGS. 1 and 2. Remote facility 100 may likewise operate in a similar manner as described above. As illustrated in FIG. 3, remote facility 100 may also include mobile drive units 20 capable of transporting display shelves 132 to inventory station 152. When a shipment of containers 142 is delivered to remote facility 100, a management module, such as management module 15 or similar management module that controls the administration and coordination of components at remote facility 100, may instruct various mobile drive units 20 to transport inventory holders 132 in need of inventory items 32 in one or more of container 142 to inventory station 152.

Display shelves 132 as illustrated in FIG. 3 may be similar to inventory holders 130 described above with respect to represent to FIGS. 1 and 2. In addition, display shelves 132 may be capable of coupling with mobile drive units 20 in a manner similar to that described above with respect to inventory holders 30 and/or container holders 40. Display shelves 132 may thus represent mobile display shelves or other appropriate mobile inventory holder operable to store and/or display inventory items in remote facility 100 and be transported by mobile drive units 20 to destinations within remote facility 100. It should be noted that while depicted as having a particular layout 120 of display shelves 132, facility 100 may have any appropriate layout 120.

Inventory station 152 represents any appropriate components for processing or handling containers 142 and/or inventory items 32. For example, inventory station 152 may represent an appropriate location at which inventory may be restocked into display shelves 132. Inventory station 152 may include any appropriate equipment to facilitate restocking activities, such as scanners for monitoring the flow of inventory items 32 in and out of remote facility 100, communication interfaces for communicating with management module 15, and/or any other suitable components. Inventory stations 152 may be controlled, entirely or in part, by human operators or may be fully automated. Moreover, the human or automated operators of inventory stations 152 may be capable of performing certain tasks to inventory items 32, such as unpacking and/or counting inventory items 32 from containers 142, as part of the operation of remote facility 100. Inventory stations 152 may include and/or form all or a part of staging area 150 described above with respect to FIG. 2. It should be noted that while illustrated as including one inventory station 152, remote facility 100 may include any appropriate number of inventory stations 152.

Remote facility 100 may operate in a similar manner as described above with respect to FIG. 2. For example, remote facility 100 may engage in normal business operations in which various inventory items 32 are removed from display shelves 132. From time to time, remote facility 100 may determine to place orders 60 for additional inventory items 132, which may be used to replenish display shelves 132. When shipments of inventory items 32 are received at inventory station 152, management module 15 may select display shelves 132 that include storage locations designated for inventory items 132 from the shipment. For example, management module 15 may compare inventory items 132 in the shipment to a virtual map of inventory items 32 in layout 120 to select particular display shelves 132 where inventory items 32 in the shipment should be placed. Management module 15 may then issue task assignments to various mobile drive units 20 to transport the selected display shelves 132 to inventory station 152 at which those display shelves 132 may be restocked.

Management module 15 may determine an inventory unpacking sequence for remote facility 100. For example, management module 15 may consider the layout 120 of the various display shelves 132 in remote facility 100 and determine an optimal sequence in which display shelves 132 are to be transported to inventory station 152 to receive inventory items 32 from display shelves 132. The sequence may, for example, be based on minimizing disruption to ongoing business activities at remote facility 100. In the illustrated embodiment, management module 15 may determine to restock display shelves 132 in a sequence according to how those display shelves 132 are arranged on aisles 92. In some embodiments, remote facility 100 may close and/or prevent access to rows 92 while display shelves 132 are being transported by mobile drive unit 20. In such embodiments, it may be desirable to move display shelves 132 in sequence as those display shelves 132 appear in sections 94. As shown, management module may determine to first transport display shelf 132a to inventory station 152, then display shelf 132b, then display shelf 132c, then display shelf 132d. Management module 15 may determine an optimal unpacking sequence assuming all or substantially all display shelves 132 in remote facility 100 need to be restocked. It should be noted, however, that while illustrated as sequential sections 94 of rows 92 are to be restocked, restocking activities of display shelves 132 may occur in any appropriate order. For example, management module 15 may determine to randomly restock display shelves 132 and/or balance the distribution of display shelves 132 being restocked amongst the various rows 92 of remote facility 100.

Management module 15 arrange orders 60 for shipment to remote facility 100 in a manner similar to that described above with respect to FIG. 2. In some embodiments, management module 15 may arrange orders 60 based on an optimal unpacking sequence determined based on layout 120 of remote facility 100. A particular order 60 may be packed according to the sequence in which inventory items 32 should be placed into display shelves 132 at inventory station 152 as those display shelves 132 arrive at inventory station 152 for restocking. Management module 15 may facilitate packing orders 60 at inventory system 10 according to the order arrangement discussed above with respect to FIG. 2 and below with respect to FIGS. 5-8. Once an order is arranged for shipment, the shipment may be sent to remote facility 100 using any appropriate means of transportation.

Management module 15 may, based on the arrangement of inventory items 32 in shipping containers 142, select display shelves 132 to receive inventory items 32. Management module 15 may determine a replenishment sequence of selected display shelves 132 to receive inventory items 32 based on the arrangement of the inventory items 32 in the shipment. Management module 15 may additionally or alternatively determine the replenishment sequence based on the arrangement of the plurality of display shelves 132 in the retail facility. The replenishment sequence may correspond to the inventory unpacking sequence of inventory items 32 as they are unpacked. The replenishment sequence may also take into account any order packing constraints that affect the arrangement of inventory items 32 in shipping containers 142. In an example, if a particular shipment is packed starting at the top with spices, followed by flour, followed by sugar on the bottom, management module 15 may select a particular display shelf 132 designated to store spices products to be transported to inventory station 150 first, followed by an display shelf 132 designated to store flour, followed by an display shelf 132 designated to store sugar. Management module 15 may then issue task assignments to various mobile drive units 20 to transport the selected display shelves 132 to inventory station 152 according to the determined replenishment sequence.

Management module 15 may determine a schedule on which mobile drive units 20 are to transport selected display shelves 132 to inventory station 152 for replenishment. For example, management module 15 may store and/or obtain predetermined times at which consumer activity at remote facility 100 is likely to be low. In some embodiments, management module 15 may receive information from appropriate sensors that provide an actual count of consumers in remote facility 100. Management module 15 may track trends in consumer activity levels and/or schedule replenishment to take place at times at which consumer activity is below and or is expected to be below a predetermined threshold. In some embodiments, management module 15 may select particular times designated for replenishment activities, such as times late at night and/or other times when few consumers are likely to be at remote facility 100. Management module 15 may additionally or alternatively schedule replenishment activities at times when operators of inventory station 152 are available. Management module 15 may also select particular windows of time in which replenishment activities may be completed, which may be based on estimated and/or actual amounts of time expected to complete the replenishment activities.

In some embodiments, management module 15 may schedule additional tasks associated with inventory items 32. For example, management module 15 may determine to purge particular inventory items 32 from particular display shelves 132. For example, management module 15 may determine that perishable inventory items 32 such as fruit or bread have expired and need to be removed from display shelves 132. As another example, management module 15 may determine to replace inventory items 32 with other inventory items 32. For example, new inventory items 32 that are expected to have better sales may replace older inventory items 32. In response to determining that such an inventory item needs to be removed from the retail facility, management module 15 may instruct one or more mobile drive units to transport one or more display shelves 132 storing the inventory item to inventory station 152. At inventory station 152, the inventory item is removed from display shelf 132.

In addition or in the alternative, management module 15 may determine to consolidate inventory items 32 to certain display shelves 132 and/or may determine to rearrange the display shelves 132 according to a new or different layout 120. Accordingly, management module 15 may issue instructions to various mobile drive units 20 to transport display shelves 132 to new locations in facility 100. Management module 15 may coordinate movement of mobile drive units 20 to ensure that display shelves 132 are transported in an orderly manner and/or at times when consumer foot traffic is low.

In some embodiments, retail facility 100 may receive entire display shelves 132 having replacement inventory items 32 from inventory system 10. Those display shelves 132 may be stored in a storage area until needed in the retail portion of facility 100. Management module 15 may determine that a quantity of inventory items 32 in a particular display shelf 132 has fallen below a predetermined threshold. In response, management module 15 may locate and/or select a replacement display shelf 132 having an additional quantity of those inventory items 32. Management module 15 may then instruct one or more mobile drive units to replace the particular display shelf 132 with the replacement display shelf 132.

During transportation of display shelves 132 to inventory station 152, mobile drive units 20 may avoid collisions with consumers or other objects at remote facility 100. For example, as mobile drive unit 20 moves display shelf 132 along a path towards inventory station 152, an obstacle and/or motion detector may continuously monitor for objects in the path of mobile drive unit 20. If an obstacle is detected, mobile drive unit 20 may take actions to avoid colliding with the object. In some embodiments, mobile drive unit 20 may be capable of distinguishing an inanimate object from another object, such as a consumer or other human. If mobile drive unit 20 detects an inanimate object, mobile drive unit 20 may request a new path to inventory station 152 from management module 15. If mobile drive unit 20 detects that the object is a human, mobile drive unit 20 may stop movement along the path and wait for the human to leave the proximity of the mobile drive unit 20. Thus, mobile drive units 20 may operate in remote facility 100 while business activities are ongoing and be capable of minimizing impact on human activities.

In the illustrated example, mobile drive units 20 successively transport display shelves 132a, 132b, 132c, and 132d to inventory station 152. At inventory station 152, automated equipment and/or a human operator may remove inventory items 32 from the shipment containers 142a-142d and place the inventory items 32 onto appropriate shelves, bins, and/or receptacles of display shelves 132. According to the teachings of the present disclosure, an appropriate display shelf 132 may arrive at inventory station 152 at or near the time inventory items 32 in the shipment are ready to be removed from containers 142 and placed into an appropriate display shelf 132.

After each display shelf 132 receives appropriate inventory items 32, the display shelf 132 may be transported back to the designated location for display shelf 132 in layout 120. For example, management module 15 may issue appropriate tasks to mobile drive units 20 to return display shelf 132 to its previous location in remote facility 100. After display shelf 132a receives appropriate inventory items 32, mobile drive unit 20 may return display shelf 132a to its original location. Display shelves 132b, 132c, and 132d may receive inventory items 32 and be returned to their respective original locations in like fashion. Thus, restocking activities at remote facility 100 may proceed in an efficient and timely manner.

Figure 4:
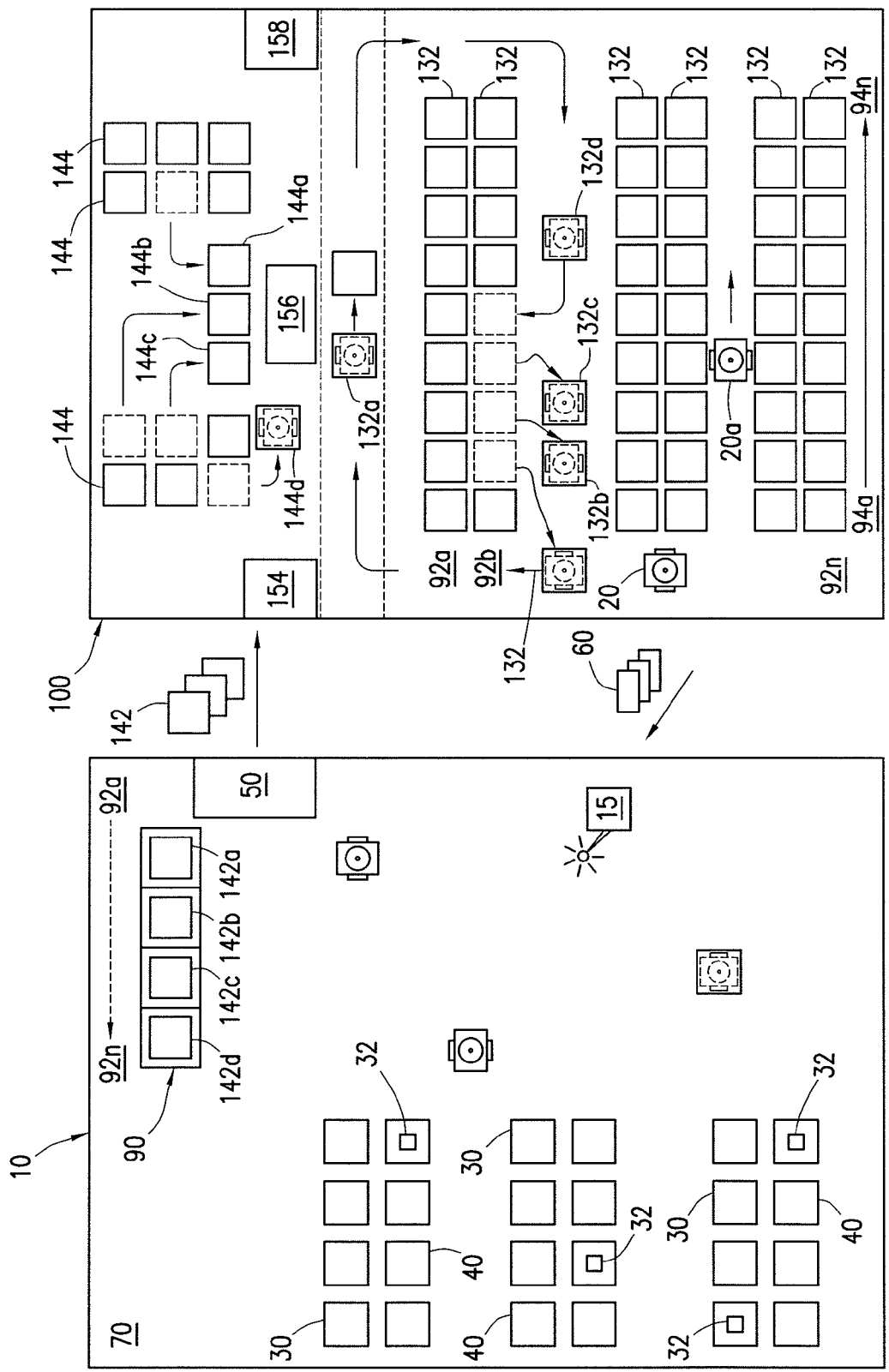
FIG. 4 is another example embodiment of an inventory system capable of arranging orders for a remote facility.

FIG. 4 is another example embodiment of an inventory system 10 capable of arranging orders for a remote facility 100. In the illustrated embodiment, inventory system 10 may operate in a similar manner as described above with respect to FIGS. 1-3. As illustrated, remote facility 100 also includes storage shelves 144, receiving station 154, restocking station 156, and retail station 158. Storage shelves 144 may be located in a storage area or other location physically and/or logically separate from display shelves 132. At receiving station 154, restocking station 156, and retail station 158, various operations related to shipping containers 142 and/or display shelves 132 may be carried out. For example, shipping containers 142 may be received into retail facility 100 at receiving station 154, at which inventory items 32 in those containers may be broken down into storage shelves 144. Inventory items 32 may be stored in storage shelves 144 until an appropriate time for restocking display shelves 132. When management module 15 determines to restock a particular display shelf 132, one mobile drive unit 20 may coordinate the transportation of storage shelf 144 and display shelf 132 to restocking station 156, at which display shelves 132 may receive replacement inventory items 32. Additionally or alternatively, management module 15 may transport shipping containers 142 to restocking station 156.

In some embodiments, remote facility 100 may operate such that restocking activities as well as consumer ordering activities are automated using mobile drive units 20. Accordingly, remote facility 100 may operate without the need for consumers to enter aisles 94 and to manually remove inventory items 32 from display shelves 132. Consumers may place orders for various inventory items 32 within remote facility 100 at retail station 158. Mobile drive units 20 may transport appropriate display shelves 132 to retail station 158 so that consumers may receive and/or purchase the ordered inventory items 32. However, in some embodiments, consumers may access the portions of retail facility 100 to select inventory items 42 directly from display shelves 132.

Storage shelves 144 store replenishment inventory items 32 for display shelves 132. As illustrated, storage shelves 144 may be located in a back room and/or storage area physically and/or logically separated from the portions of retail facility 100 that store display shelves 132 and/or are accessible by consumers. Storage shelves 144 may be substantially similar to inventory holders 30 located at inventory system 10. Storage shelves 144 may be configured to be transported by mobile drive units 20 to appropriate locations in facility 100. Storage shelves 144 may represent a temporary storage location for inventory items 32. Thus, inventory items 32 may be removed from shipping containers 142 at times that display shelves 132 are not available for restocking and/or even if display shelves 132 are not yet in need of inventory items 32. For example, shipping containers 142 may be broken down and inventory items 32 stored therein may be placed on storage shelves 144 even at times when consumer activity in facility 100 is high.

Receiving station 154 represents a station operable to receive and/or ship containers 142 and/or other items to and from remote facility 100. Receiving station 154 may represent an inventory station configured in a similar manner to inventory station 152. At receiving station 154, shipments of containers 142 may be received. Receiving station 154 may include a staging area similar to staging area 150 for receiving containers 142, and, in some embodiments, may include a shipping dock or other appropriate receiving area for shipping containers 142. Receiving station 154 may include appropriate equipment and/or operators for breaking down and/or removing inventory items 32 from containers 142. Those inventory items 32 may be placed into storage shelves 144.

Restocking station 156 may represent an inventory station at which various replenishment activities may take place for display shelves 132. Restocking station 156 may represent an inventory station configured in a similar manner to inventory station 152. At restocking station 156, operators may transfer inventory items 32 from storage shelves 144 and/or shipping containers 142 to appropriate display shelves 132 transported to restocking station 156 by mobile drive units 20. Shipping containers 142 may also be configured to be transported by mobile drive units 20 to an appropriate location proximate to restocking station 156.

Retail station 158 may represent a point-of-sale station operable to sell, loan, or otherwise exchange inventory items 32 with one or more customers of remote facility 100. Retail station 158 may represent an inventory station configured in a similar manner to inventory station 152. Retail station 158 may include point-of-sale, ordering, or other equipment at which consumers may purchase inventory items 32. For example, retail station 158 may include automated ordering equipment accessible by a consumer at which a consumer may place an order for various inventory items 32. Retail station 158 may include an kiosk or other self-service interface at which a customer may order inventory items 32 in facility 100. Retail station 158 may include an operator or automated equipment to transfer inventory items 32 from display shelves 132 to bags, packages, boxes, or other receptacles usable by a consumer at facility 100. In some embodiments, the consumer itself may remove inventory items 32 from display shelves 132. It should be noted that while illustrated as including one retail station 158, remote facility 100 may include any appropriate number of retail stations 158 to meet consumer demand for orders of inventory items 32. Likewise, remote facility 100 may include any appropriate number of receiving stations 154 and/or restocking stations 156.

In operation, consumers may place orders for various inventory items 32 stored in display shelves 132 at retail station 158. Management module 15 may issue various task assignments to mobile drive units 20 to transport inventory holders to retail stations 158 so that the ordered inventory items 32 may be received and/or purchased by the consumer. During the course of such business operations, inventory items 32 may be depleted from display shelves 132. The point-of-sale system may, for example, monitor inventory levels in display shelves 132 in a similar manner as is described above with respect to inventory holders 130. Management module 15 may thus at various times determine to place an order for additional replacement inventory items 32, as described above with respect to FIG. 3.

Management module 15 may place one or more orders 60 for replacement inventory items 32 and/or arrange orders for shipment at inventory system 10, as described above. Shipping containers 142 corresponding to the orders 60 may be received at receiving station 154.

Once shipping containers 142 are received at receiving station 154, those containers may be broken down/and or disassembled into individual inventory items 32 and/or groups of inventory items 32. Management module 15 may instruct one or more mobile drive units to transport storage shelf 144 to receiving station 154. At receiving station 154, inventory items 32 may be placed onto storage shelf 144. Management module 15 may track which particular storage shelf 144 receives particular inventory items 32. Each storage shelf 144 may be pre-designated to receive particular inventory items 32 and/or may be utilized on an ad-hoc basis. Storage shelves 144 may be utilized to store inventory items 32 on a temporary basis until management module 15 determines to replace inventory items 32 in display shelves 132. After receiving inventory items 32 at receiving station 154, management module 15 may instruct mobile drive units 20 to transport storage shelves 144 to storage locations to wait until inventory items 32 needed by those storage shelves 144 are needed at restocking station 156.

Management module 15 may detect that one or more display shelves 144 are low on inventory items 32. Management module 15 may determine that an amount of inventory items 32 in display shelf 132 has fallen below a predetermined threshold. Management module 15 may determine whether replacement inventory items 32 are available in storage shelves 144 and/or if an order 60 should be placed for those additional inventory items 32. If the needed inventory items 32 are located in storage shelves 144 and/or in shipping containers 142 located at facility 100, management module 15 may coordinate mobile drive units 20 to replenish inventory items 32 in display shelves 132. For example, management module 15 may coordinate the transportation of display shelf 132 and storage shelf 144 such that the storage shelf 144 may be located at the inventory station at the same time that display shelf 132 is located at the inventory station. The arrival of display shelf 132 and storage shelf 144 at restocking station 156 may be timed such that the storage shelf 144 and display shelf 132 arrive at substantially the same time and/or may be timed such that storage shelf 144 arrives before display shelf 132. For example, management module 15 may determine that an amount of inventory item 32 in display shelf 132 is low. Management module 15 may schedule a time at which that display shelf 132 is to be replenished at restocking station 156. Management module 15 may thus schedule task assignments for one mobile drive unit 20 to transport display shelf 132 to restocking station 156 at the scheduled time. Management module 15 may determine which storage shelf 144 stores replacement inventory items 32 and select that storage shelf 144 to be transported to restocking station 156 at substantially the same time. Management module 15 may thus schedule tasks assignments for another mobile drive unit 20 to transport that storage shelf 144 holding replacement inventory items 32 to restocking station 156. Accordingly, management module 15 may issue instructions to the first mobile drive unit 20 to transport display shelf 132 and other instructions to the other mobile drive unit 20 to transport storage shelf 144 to restocking station 156. When both storage shelf 144 and display shelf 132 are at restocking station 156, an operator and/or automated equipment may transfer an appropriate amount and/or type of inventory item 32 from storage shelf 144 to display shelf 132. After being replenished with replacement inventory items 32, management module 15 may issue instructions for mobile drive unit 20 to return display shelf 132 to its original location in facility 100 and/or to transport display shelf to some other designated location in facility 100. Likewise, management module 15 may issue appropriate instructions for mobile drive unit 20 to transport storage shelf 144 to a storage location in facility 100.

Management module 15 may determine an appropriate inventory replenishment sequence for display shelves 132. For example, management module 15 may determine an inventory replenishment sequence by which storage shelves 144 and appropriate display shelves 132 are to be transported by mobile drive units to restocking station 156. Management module 15 may also determine a schedule in which the display shelves 132 and storage shelves 144 are to be transported to restocking station 156. The schedule may take into account similar considerations as discussed above. As illustrated, the sequence may be such that appropriate storage shelf 144a is located at restocking station 156 while display shelves 132 are transported to restocking station 156 to receive inventory items 32 from storage shelf 144 that are designated for storage in those display shelves 132. It should be noted that while in some embodiments management module 15 determines an inventory replenishment sequence for display shelves 132, management module 15 may additionally or alternatively schedule display shelves 132 for replenishment based on a predetermined schedule and/or based on detecting that display shelf 132 is low on inventory items 132.

In the illustrated example, mobile drive units 20 successively transport display shelves 132a, 132b, 132c, and 132d to restocking station 156 in accordance with the inventory replenishment sequence determined by management module 15. Likewise, mobile drive units 20 successively transport storage shelves 144a, 144b, 144c, and 144d from receiving station 154 to restocking station 156. At restocking station 156, automated equipment and/or a human operator may remove inventory items 32 from the storage shelves 144a-144d and place the inventory items 32 onto appropriate shelves, bins, and/or receptacles of display shelves 132. According to the teachings of the present disclosure, an appropriate display shelf 132 may arrive at restocking station 156 at or near the time inventory items 32 in the shipment are ready to be removed from storage shelves 144a-144d and placed into an appropriate display shelf 132. For example, storage shelf 144a may be moved to restocking station 156 and remain stationary while one or more of display shelves 132a and/or display shelf 132b are moved to restocking station 156 to receive inventory items 32 from storage shelf 144. Likewise, storage shelves 144b-144d may successively be moved to restocking station 156 as locations at restocking station 156 become available.

In some embodiments, management module 15 may determine to unpack and/or disassemble shipping containers 142 at restocking station 156. Accordingly, management module 15 may take into account the order packing arrangement and/or the order in which inventory items 32 are to be removed from shipping container 142. For example, management module 15 may first schedule the display shelves 132 that are designated to receive inventory items 32 that are to be removed first from shipping container 142. Thus, each shipping container 142 may be ready to be broken down into appropriate inventory items 32 as each display shelf 132a-132d moves to restocking station 156 in need of those inventory items 32.

After receiving appropriate inventory items 32, display shelves 132 may be returned to their respective original locations in remote facility 100. In a fully automated remote facility 100, in which both replenishment and ordering activities are automated, management module 15 may have more flexibility to schedule replenishment activities in a more efficient manner that would otherwise be achievable.

FIG. 5 illustrates an example embodiment of packing an order in container 142. As illustrated, container 142 may include inventory items 32 intended to fulfill order 60. Those inventory items 32 may be brought to inventory station 50 in inventory holders 30 and/or container holders 40 using mobile drive units 20. The order in which inventory items 32 are transported to inventory station 50 may be according to the order packing arrangement determined by management module 15. As illustrated, container 142 may include inventory items 32 that are intended to fill one or more sections 94 of aisles 92 in facility 100. For example, inventory items 32 intended for section 94n of a given aisle 92 may be packed first and inventory items 32 corresponding to subsequent sections may be added until reaching inventory items 32 corresponding to section 94a of layout 120. In some embodiments, container 142 may store more than one aisle 92 of inventory items 32. If, for example, the end of a aisle 92 is reached before completely packing container 142, management module 15 may facilitate continued packing of container 142 by adding inventory items 32 from another aisle 92, such as a aisle 92 adjacent to the previously packed aisle 92.

In some embodiments, management module 15 may take into account various other factors that constrain packing a given container 142. Accordingly, order packing constraints may be considered in addition or in the alternative to the order packing arrangement determined as discussed above. In some embodiments, management module 15 may modify the order packing arrangement based on various characteristics of inventory items 32. Management module 15 may modify an order arrangement based on various characteristics that may affect the order in which the inventory items may be packed, such as the size, shape, weight, crushability, and/or bulk of inventory items 32. For example, management module 15 may determine that an item 32 should be packed relatively earlier in the order packing arrangement due to its weight, size and/or bulk. As another example, management module 15 may determine to place a relatively lighter, more crushable, and/or more fragile item later in the order packing arrangement.

Management module 15 may determine, obtain, and/or store one or more properties of inventory items 32 to be arranged. Based on the one or more properties, management module 15 may determine that an order packing constraint exists. For example, inventory item 32 may be relatively heavier objects, such as canned goods, while other inventory items 32 may be relatively lighter items, such as cardboard boxes of other goods. Management module 15 may modify the order arrangement to place the relatively heavier items 32 lower in container 142 than the relatively lighter items 32. Management module 15 may additionally or alternatively take into account the weight distribution and/or center of gravity of container 142 when determining whether to modify an order arrangement. For example, management module 15 modify an order arrangement to maintain an average weight distribution of various items 32 within container 142 within acceptable tolerances. Management module 15 may thereby maintain an acceptable center of gravity of container 142 so that container 142 may not be prone to tipping and/or become difficult to transport. As another example, management module 15 may determine to arrange relatively crushable items such that they are packed later in the order packing arrangement. Accordingly, management module 15 may attempt to optimize the order arrangement while also ensuring that container 142 remains stable for shipment.

The order packing arrangement determined by management module 15 may, in some embodiments, include instructions for arranging inventory items 32 on shipping container 142. The order packing arrangement may additionally or alternatively include instructions for arranging multiple shipping containers 142. Management module 15 may, in some embodiments, provide instructions to an operator at inventory station 50 for arranging the sequence in which inventory items 32 are placed onto the shipping container 142. In some embodiments, management module 15 may instruct the operator how to orient each inventory item 32 as it is placed onto shipping container 142. For example, management module 15 may indicate a location on shipping container 142 to place inventory item 32 and/or may indicate a vertical and/or horizontal orientation of inventory item 32 when placed at the indicated location. As illustrated, inventory station 50 includes a display device 300 that displays an image of shipping container 142 as it is being assembled by the operator. In the illustrated embodiment, an image of inventory 32 is displayed on display device 300, along with an indication of where to place inventory item 32 and/or how inventory item 32 should be oriented on shipping container 142. It should be understood, however, that while a particular embodiment is illustrated in FIG. 5, management module 15 may provide instructions on arranging inventory items 32 at inventory station 50 in any appropriate manner. For example, management module 15 may provide instructions using any appropriate human-machine interface and/or may provide instructions to automated equipment at inventory station 50.

In order to facilitate compliance with packing constraints, management module 15 may utilize one or more drift spaces. For example, management module 15 may issue tasks to various components of system 10, such as mobile drive units 20, to transport containers 40 to drift spaces, containers 40 holding inventory items 32 needed by order 60. The decision to send a given inventory holder 30 to a drift space may be based on determining that an inventory item 32 the inventory holder 30 carries is needed relatively later in the packing process. Meanwhile, inventory holders 30 that contain inventory items 32 needed earlier may take the available locations at inventory station 50. As container 142 containing order 60 is packed, management module 15 may issue appropriate triggering events to mobile drive units 20 waiting in drift spaces 90 to transport the appropriate container 40 to inventory station 50. Those triggering events may, for example, be based on the enforcement of packing constraints. Thus, management module 15 may utilize drifting techniques to more efficiently pack container 142 according to the determined inventory sequence and various packing constraints. Furthermore, it should be noted that while container 142 is illustrated as being packed by a human operator, it should be understood that containers 142 may be built and/or assembled in any suitable manner including using robotic packing equipment, conveyor systems, and/or other equipment.

Figure 6:
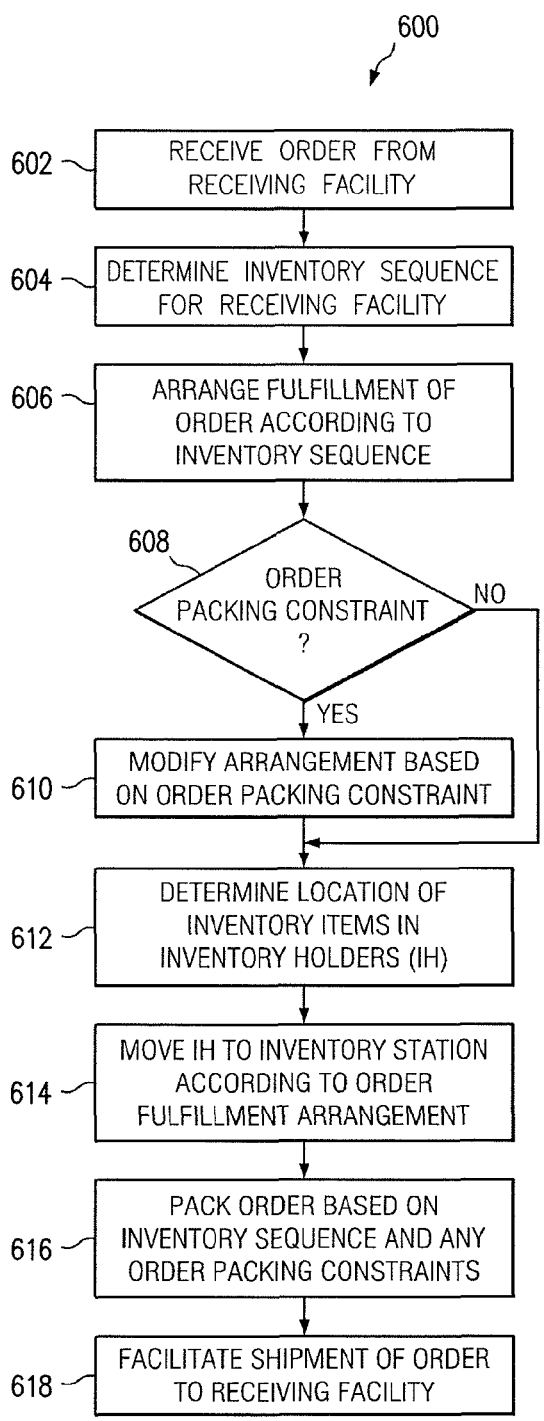
FIG. 6 is a flowchart representing an example embodiment of operation of an inventory system.

FIG. 6 is a flowchart that represents an example embodiment of operation of system 10. Method 600 begins at step 602, where management module 15 may receive order 60 for various inventory items 32 destined for receiving facility 100. At step 604, management module 15 may determine an inventory unpacking sequence for a receiving facility 100. For example, management module 15 may determine layout 120 of various inventory item types and quantities within facility 100. Based on the layout of those inventory items and other appropriate factors, management module 15 may determine an appropriate inventory unpacking sequence for facility 100. At step 606, the inventory items 32 to fulfill order 60 are arranged according to the inventory unpacking sequence. For example, an order packing arrangement may determine an organization of inventory items 32 for order 60 that are packed at inventory station 50, such that those items 32 may be unpacked at facility 100 according to the inventory unpacking sequence.

At step 608, management module 15 may determine whether any order packing constraints exist. For example, management module 15 may determine, based on various order packing constraints, whether to modify the order packing arrangement according to weight distribution policies and/or other characteristics of inventory items 32 in order 60. If those order constraints exist, then management module 15 at step 610 will modify the arrangement based on the order packing constraint. If no order constraints exist, then method 600 continues from step 612. At step 612, management module 15 may determine the location of inventory items 32 within inventory holders 30 and/or 40. It should be understood that while discussed as being a modification to the order arrangement, management module 15 may take into account any order packing constraints from the outset of determining the order arrangement.

At step 614, management module 15 may then facilitate transportation of those inventory items 32 to inventory station 50 according to any number of and combination of the techniques described herein in this disclosure. For example, mobile drive units 20 and/or other components of system 10 may move inventory holders 30 and/or containers 40 holding the inventory items 32 needed for completion of order 60 to an inventory station 50. Those items may be transported to inventory station 50 according to the order fulfillment arrangement determined by management module 15.

At step 616, order 60 may be packed at inventory station 50 based on the inventory sequence and any order packing constraints that may have resulted in a modified order arrangement. Once one or more containers 142 containing all or a portion of order 60 are completed at step 618, those containers 142 may be shipped to the receiving facility 100. Management module 15 may facilitate the shipment of those orders in any suitable manner. Once the containers 142 are received at staging area 150 of facility 100, items 32 may be unpacked according to the inventory unpacking sequence of facility 100.

FIG. 7 is a flowchart representing an example embodiment of operation of a remote facility 100 capable of replenishing display shelves 132 with inventory items 32 from shipments 142. Method 700 begins at step 702, at which a shipment 142 corresponding to an order may be received at remote facility 100. An order may correspond to various shipping containers 142 of inventory items 32 ordered to replenish display shelves 132 in remote facility 100. Containers 142 corresponding to orders 60 may be arranged according to an order packing arrangement such that the orders may be unpacked according to an optimal unpacking sequence. For example, containers 142 may be arranged to be unpacked according to the sequence in which management module 15 determines that display shelves 132 should be transported to inventory stations 152 to replenished. In some embodiments, however, shipment containers 142 that are to be unpacked into storage shelves 144 may not be packed with any particular order packing arrangement and/or may be packed according to an unpacking arrangement appropriate for storage shelves 144.

At step 704, management module 15 may select particular display shelves 132, such as display shelves at a retail facility, that are designated to receive inventory items 32 in shipping containers 142 for transportation to restocking stations 156. For example, those display shelves 132 selected may be low on inventory items 32 that are located in shipping containers 142 and/or storage shelves 144. Management module 15 may locate the particular shipping container 142 and/or storage shelf 144 storing the additional inventory items 32 needed by display shelf 132. In some embodiments, management module 15 may determine that a particular inventory holder 32 is designated to store a particular inventory item 32 by examining a virtual map of inventory items 32 in layout 120.

Once particular display shelves 132 are selected at step 706, management module 15 may determine a sequence in which the selected display shelves 132, shipping containers 142, and/or storage shelves 144 should be transported to inventory station 152. For example, management module 15 may coordinate the movement of a selected display shelf in need of a particular inventory item 32 and movement of a selected storage shelf 144 storing that particular inventory item 32 such that both are transported to restocking station 156. As another example, management module 15 may determine a replenishment sequence based on the order in which inventory items 32 are to be removed from containers 142, storage shelves 144, and/or placed into particular display shelves 132. The replenishment sequence determined by management module 15 may include particular times at which containers 142 and/or storage shelves 144 are to be transported to restocking station 156. The replenishment sequence may schedule arrivals such that container 142 and/or storage shelf 144 having inventory items 32 for a particular display shelf 132 is available at restocking station 156 when that particular display shelf 132 is transported to restocking station 156. For example, the times may be scheduled such that a particular container 142 and/or storage shelf 144 is located at restocking station 156 at substantially the same time as display shelf 132.

At step 708, management module 15 may determine whether any foot traffic constraints may limit the ability to replenish the selected display shelves 132. For example, facility 100 may be open to the public during certain hours of the day and/or may experience different levels of activity at different times of the day and/or week. Management module 15 may schedule restocking activities to minimize impact on consumer activities. For example, certain times of the day and/or week may be designated as time in which replenishment and/or restocking activities are to take place. For example, remote facility 100 may be closed to the public at night and/or on weekends.

If there are foot traffic constraints, management module 15 may at step 710 determine an optimal schedule to restock inventory items 32 based on the foot traffic constraints. Management module 15 may schedule movements of mobile drive units 20 at times at which foot traffic is minimum and/or times at which the remote facility 100 is closed to the public. Moreover, management module 15 may, in some embodiments, take into account an estimated and/or actual amount of time expected to replenish particular display shelves 132. Management module 15 may schedule replenishment activities to be within particular time slots and/or windows of time during which the replenishment activities may be completed. If replenishment activities for a particular display shelf 132 cannot be completed within the slot and/or window, management module 15 may schedule that display shelf 132 for the next available time slot and/or window of time.

If there are no foot traffic constraints at step 708 and/or when an optimal schedule is completed at step 710, management module 15 may instruct mobile drive units 20 to transport display shelves 132, such as display shelves of a retail facility, to restocking station 156 based on the sequence determined at step 706 and/or schedule determined at step 710. No foot traffic constraints may exist, for example, in a facility 100 in which display shelves are not directly accessible to the public, such as a fully automated retail facility such as is discussed above with respect to FIG. 4. Additionally or alternatively, no foot traffic conditions may exist if a shipment is received during off-hours and/or when the remote facility is closed. Management module 15 may provide a path to a destination of display shelf 132 to mobile drive unit 20. Mobile drive unit 20 may traverse the path in a segment-by-segment manner, traversing segments of the path as management module 15 grants reservation requests from the mobile drive unit 12 for each segment. Once at the display shelf 132, mobile drive unit 20 may dock, couple, lift, or otherwise connect to display shelf 132. Mobile drive unit 20 may then proceed along a path to restocking station 156 in a similar manner. Management module 15 may provide similar instructions to another mobile drive unit 20 to transport container 142 and/or storage shelf 144 to restocking station 156.

As display shelves 132 arrive at restocking station 156 according to the replenishment sequence, human and/or automated operators of restocking station 156 may transfer appropriate inventory items 32 into each display shelf 132 at step 714. For example, at step 714, the display shelves of a retail facility may be replenished with new and/or replacement inventory items 32. After display shelves 132 are replenished at step 714, display shelves 132 may be returned to their respective designated display locations within remote facility 100 at step 716. The location of a particular display shelf 132 may be designated based on determining the location of display shelf 132 and/or inventory items 32 in a virtual map and/or layout 120 of facility 100. Likewise, storage shelves 144 may be returned by mobile drive units 20 to their respective storage locations in facility 100.

At 718, management module 15 may determine during the course of the operation of remote facility 100 if additional inventory items 32 from outside facility 100 are needed to replenish additional display shelves 132. For example, management module 15 may determine that an amount of inventory items 32 stored in storage shelves 144 and/or display shelves 132 is below a predetermined amount. If additional inventory items 32 are needed, management module 15 may determine to place an order to, for example, inventory system 10. Management module 15 may determine whether additional inventory items 32 are needed in any appropriate manner, including monitoring outflow of inventory items 32 as indicated by a point-of-sale system and/or by utilizing a mobile drive unit 20 to count the actual inventory items 32 in display shelves 132, as discussed above. If no additional inventory items 32 are needed, management module 15 may continue to monitor inventory levels. If additional inventory items 32 are needed, management module 15 may, at step 720, build and/or place an order 60 for additional inventory items 32. At step 722, management module 15 may place one or more orders 60 to inventory system 10. Inventory system 10 may, in turn, determine an optimal order arrangement for inventory items 32 on the orders 60, and build the orders 60 according to the optimal order arrangement. Once inventory system 10 builds and ships the orders 60, method 700 may return to step 702, where the orders 60 may be received by remote facility 100.

Modifications, additions, or omissions may be made to methods 600 and 700 illustrated respectively in the flowchart of FIGS. 6 and 7. For example, management module 15 is capable of assigning many tasks at once and/or in parallel. Thus, management module 15 may also process many orders 60 in parallel and/or in sequence. Moreover, management module 15 may be capable of determining inventory sequences for any number and types of facilities 100. Orders 60 corresponding to various of those facilities 100 may be processed by management module 15 sequentially and/or at the same time using various inventory stations 50. Additionally, the steps of FIGS. 6 and 7 may be performed in parallel or in any suitable order. Moreover, the embodiments described with respect to the of the present disclosure are expected to be fully combinable and suitable for use in appropriate embodiments described herein. Management module 15 may thus be capable of determining the optimal order packing arrangement of various inventory items 32 across a multitude of orders 60. Management module 15 may additionally or alternatively take into account the locations of those inventory items 32 within inventory holders 30 and 40 when determining an order arrangement.

Figure 8:
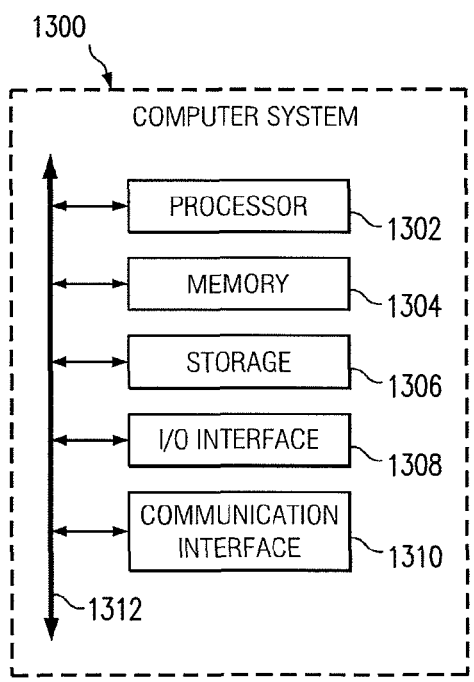
FIG. 8 illustrates an example computer system that may be used for one or more portions of the systems and method disclosed herein.

FIG. 8 illustrates an example computer system 1300 that may be used for one or more portions of the systems and method disclosed herein. In particular embodiments, one or more computer systems 1300 perform one or more steps of one or more methods described or illustrated herein. In particular embodiments, one or more computer systems 1300 provide functionality described or illustrated herein, such as, for example, any appropriate component of system 10, such as management module 15 and/or mobile drive unit 20. In particular embodiments, software running on one or more computer systems 1300 performs one or more steps of one or more methods described or illustrated herein or provides functionality described or illustrated herein. Particular embodiments include one or more portions of one or more computer systems 1300.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple datacenters; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. Although this disclosure describes and illustrates a particular processor, this disclosure contemplates any suitable processor.

In particular embodiments, memory 1304 includes main memory for storing instructions for processor 1302 to execute or data for processor 1302 to operate on. In certain embodiments, memory 1304 may be memory includes in any of the system 10 components discussed above, such as management module 15 and/or mobile drive units 20. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. Although this disclosure describes and illustrates particular memory, this disclosure contemplates any suitable memory.

In particular embodiments, storage 1306 includes mass storage for data or instructions. In certain embodiments, storage 1306 may be included in any appropriate component of system 10, including management module 15 and/or mobile drive units 20. Storage 1306 may include removable or non-removable (i.e., fixed) media, where appropriate. Storage 1306 may be internal or external to computer system 1300, where appropriate. In particular embodiments, storage 1306 is non-volatile, solid-state memory. Where appropriate, storage 1306 may include one or more storages 1006. Although this disclosure describes and illustrates particular storage, this disclosure contemplates any suitable storage.

In particular embodiments, I/O interface 1308 includes hardware, software, or both providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 1310 for it. Although this disclosure describes and illustrates a particular communication interface, this disclosure contemplates any suitable communication interface.

In particular embodiments, bus 1312 includes hardware, software, or both coupling components of computer system 1300 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1302 (such as, for example, one or more internal registers or caches), one or more portions of memory 1304, one or more portions of storage 1306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise-return facility. In such an embodiment, inventory items may represent merchandise returned by customers. Units of these inventory items may be stored in inventory holders 30 when received at the facility. At appropriate times, a large number of units may be removed from a particular inventory holder 30 and packed for shipment back to a warehouse or other facility.

As yet another example, inventory system 10 may represent a manufacturing facility with inventory items 32 representing individual components of a manufacturing kit to be included in an assembled product, such as electronic components for a customized computer system. In such an embodiment, inventory system 10 may retrieve particular components identified by a specification associated with an order for the product so that a customized version of the product can be built. Although a number of example embodiments are described, inventory system 10 may, in general, represent any suitable facility or system for storing and processing inventory items. Similarly, inventory items 32 may represent objects of any type suitable for storage, retrieval, and/or processing in a particular inventory system 10.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, inventory stations 50, or other elements of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Moreover, while the present disclosure discusses specific examples of container holders 40, any appropriate number and types of container holders 40 may be used. For example, container holders 40 may be substantially similar or identical to inventory holders 30. For example, inventory system 10 may include general-purpose holders that can be used as both inventory holders 30 and container holders 40. Inventory system 10 may include a number of general-purpose holders that may be dynamically designated as an inventory holder 30 or a container holder 40 depending on whether inventory items 32 or containers 42 are stored on the relevant holder at that particular time. Moreover, in particular embodiments, holders may be configured to simultaneously store both inventory items 32 and containers 42 and a particular holder may, at a particular point in time, represent both an inventory holder 30 and a container holder 40.

It should also be noted that the various components of inventory system 10 complete various operations involving inventory items 32 and/or the components of inventory system 10 themselves. Management module 15 manages the operation of components and the use of various system resources to facilitate the fulfillment of these tasks. Although the description above focuses on various embodiments of inventory system 10 capable of performing specific operations, a particular embodiment of inventory system 10 may be configured to perform any appropriate operations associated with the storage, processing, transport, or removal of inventory items 32.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system comprising:
   a plurality of storage shelves at a retail facility, a storage shelf operable to store a plurality of replenishment inventory items;
   a plurality of display shelves at the retail facility, a display shelf operable to receive one or more replenishment inventory items from a storage shelf;
   a management module configured to:
      determine to replenish a display shelf with an inventory item stored by a storage shelf; and
      coordinate movement of a plurality of mobile drive units to replenish the display shelf with the inventory item stored by the storage shelf at an inventory restocking station;
   a first mobile drive unit configured to receive first instructions from the management module to transport the display shelf to the inventory restocking station; and
   a second mobile drive unit configured to receive second instructions from the management module to transport the storage shelf to the inventory restocking station;
   wherein the display shelf receives the inventory item stored by the storage shelf at the inventory restocking station.

2. The system of claim 1, the management module further configured to:
   calculate an optimal schedule for transporting the plurality of display shelves to the inventory restocking station;
   instruct the first mobile drive unit to transport the display shelf to the inventory restocking station at a scheduled time in accordance with the optimal schedule;
   instruct the second mobile drive unit to transport the storage shelf to the inventory restocking station at the scheduled time; and
   wherein the optimal schedule is based at least in part upon determining times at which consumer activity in the retail facility is low.

3. The system of claim 1, the first mobile drive unit further configured to:

while transporting the display shelf, move along a path to the inventory restocking station;
detect a presence of an obstacle in proximity to the first mobile drive unit while on the path; and
in response to detecting the presence of the obstacle, determining whether the obstacle in the path is a human; and
if the obstacle is a human, stop moving until the human is no longer in proximity to the mobile drive unit.

4. The system of claim 1, wherein:
the first mobile drive unit is further configured to, after one or more inventory items are received into the display shelf at the inventory restocking station, transport the display shelf to a designated display location within the retail facility; and
the second mobile drive unit is further configured to transport the storage shelf to a designated storage location within the retail facility.

5. A method, comprising:
detecting, by a management module comprising memory and one or more processors, that a display shelf at a retail facility needs to be replenished with an inventory item;
determining, by the management module, that the inventory item is stored in an inventory holder at the retail facility;
instructing, by the management module, a first mobile drive unit to transport the display shelf to an inventory station at the retail facility;
instructing, by the management module, a second mobile drive unit to transport the inventory holder to the inventory station at the retail facility;
after the inventory item stored in the inventory holder is received by the display shelf at the inventory station, instructing the first mobile drive unit to transport the display shelf to a designated location within the retail facility.

6. The method of claim 5, further comprising:
coordinating the transportation of the display shelf and the inventory holder such that the inventory holder is located at the inventory station at the same time that the display shelf is located at the inventory station.

7. The method of claim 5, further comprising:
monitoring, by a point-of-sale system, inventory levels of a plurality of display shelves;
determining, by the management module, to order additional inventory items based at least in part upon the inventory levels; and
placing an order to a distribution warehouse for the additional inventory items.

8. The method of claim 5, further comprising:
determining that an amount of inventory items in a plurality of storage shelves is below a predetermined amount; and
determining to order an additional amount of the inventory items from a distribution warehouse based at least in part upon the amount of inventory items.

9. The method of claim 5, further comprising:
detecting, by the first mobile drive unit, a presence of an obstacle in proximity to the first mobile drive unit while on a path to the inventory station; and
in response to detecting the presence of the obstacle, avoiding a collision with the obstacle.

10. The method of claim 5, further comprising:
determining a replenishment sequence for a plurality of display shelves at the retail facility; and
wherein the first mobile drive unit is instructed to transport the display shelf to the inventory station based at least in part upon the replenishment sequence.

11. The method of claim 5, wherein the inventory holder comprises a shipping container and the method further comprises:
determining an order unpacking sequence of the shipping container based at least in part upon an arrangement of inventory items in the shipping container; and
instructing a plurality of mobile drive units to transport a plurality of display shelves to the inventory station based at least in part upon the order unpacking sequence.

12. The method of claim 5, wherein the retail facility comprises a plurality of display shelves arranged into aisles and the method further comprises determining a sequence in which the display shelves are to be transported to the inventory station based at least in part upon the arrangement of the display shelves.

13. The method of claim 5, further comprising:
receiving, from a customer of the retail facility, a request for inventory items stored in one or more of the plurality of inventory holders; and
instructing one or more mobile drive units to transport the one or more inventory holders storing the requested inventory items to a point-of-sale station.

14. The method of claim 5, further comprising:
instructing a third mobile drive unit to traverse a path;
instructing the third mobile drive unit, while on the path, to detect an amount of inventory items in an inventory holder;
receiving, by the management module, information indicating the amount; and
placing an order for additional inventory items if the amount is below a predetermined threshold.

15. The method of claim 5, further comprising:
detecting, by the third mobile drive unit, an inventory item in an inventory holder;
receiving, by the management module, information identifying the inventory item;
comparing the identified inventory item to a virtual map of inventory in the remote facility; and
based at least in part upon the comparison, determining whether the inventory holder of the identified inventory item is a correct inventory holder of the inventory item.

16. The method of claim 5, further comprising:
receiving a shipment of additional inventory items at a receiving station; and
unpacking the shipment into one or more storage shelves at the receiving station.

17. The method of claim 5, further comprising:
receiving an order from the retail facility, the order comprising a plurality of inventory items;
determining, by the management module, an order packing arrangement for the plurality of inventory items based at least in part upon an inventory unpacking sequence; and
building a shipment at a distribution warehouse according to the order packing arrangement.

18. An apparatus comprising:
an interface to obtain an inventory replenishment sequence for a retail facility, the inventory replenishment sequence comprising a sequence in which a plurality of display shelves receive inventory items at an inventory station; and
a processor communicatively coupled to the interface and operable to instruct one or more mobile drive units at the retail facility to transport the plurality of display shelves to the inventory station such that the plurality of display shelves receive inventory items according to the inventory replenishment sequence.

19. The apparatus of claim 18, wherein the processor is further operable to:
locate a storage shelf storing an inventory item needed by a particular display shelf;
coordinate movement of the storage shelf and the particular display shelf to the inventory station by issuing instructions to the one or more mobile drive units.

20. The apparatus of claim 18, wherein the processor is further operable to:
instruct the one or more mobile drive units to transport the plurality of display shelves to a plurality of designated locations within the retail facility after receiving one or more inventory items at the inventory station.

21. The apparatus of claim 18, wherein the processor is further operable determine the inventory replenishment sequence based at least in part upon one or more of a first arrangement of inventory items in a shipping container and a second arrangement of the plurality of display shelves in the retail facility.

22. The apparatus of claim 18, wherein the processor is further operable to:
determine a particular inventory item to be removed first from a shipping container at the retail facility;
select a display shelf designated to store the particular inventory item;
instruct a mobile drive unit to move to the selected display shelf and dock with the selected display shelf; and
instruct the mobile drive unit to transport the selected display shelf to the inventory station to receive the particular inventory item.

23. The apparatus of claim 18, wherein the inventory replenishment sequence is based at least in part upon a layout of inventory items in one or more display shelves at the retail facility and a sequence in which the one or more display shelves are to be transported to the inventory station.

24. The apparatus of claim 23, wherein the sequence in which the one or more display shelves are to be transported to the inventory station is calculated to minimize impact on consumer activity within the retail facility.

25. The apparatus of claim 18, the processor further operable to:
determine that a particular inventory item needs to be removed from the retail facility;
instruct one or more mobile drive units to transport one or more display shelves storing the particular inventory item to the inventory station, wherein the particular inventory item is removed from the display shelf at the inventory station.

26. The apparatus of claim 18, the processor further operable to:
instruct one or more mobile drive units to rearrange a plurality of display shelves at the retail facility.

27. The apparatus of claim 18, wherein the retail facility is operable to receive a replacement display shelf from a distribution center, and the processor is further operable to:
determine that a quantity of inventory items in a particular display shelf has fallen below a predetermined threshold;
select the replacement display shelf to replace the particular display shelf, the replacement display shelf having an additional quantity of inventory items; and
instructing one or more mobile drive units to replace the particular display shelf with the replacement display shelf.

28. The apparatus of claim 18, wherein the inventory items are stored in a warehouse portion of the retail facility.

* * * * *